United States Patent
Collins

(10) Patent No.: US 7,494,070 B2
(45) Date of Patent: *Feb. 24, 2009

(54) ACCURATE HORTICULTURAL SPRINKLER SYSTEM AND SPRINKLER HEAD

(76) Inventor: Galen Collins, 2595 Mt. Pleasant Rd., San Jose, CA (US) 95148

( * ) Notice: Subject to any disclaimer, the term of this patent is extended or adjusted under 35 U.S.C. 154(b) by 0 days.

This patent is subject to a terminal disclaimer.

(21) Appl. No.: 10/744,324

(22) Filed: Dec. 22, 2003

(65) Prior Publication Data

US 2004/0135001 A1 Jul. 15, 2004

Related U.S. Application Data

(62) Division of application No. 10/134,340, filed on Apr. 25, 2002, now Pat. No. 6,688,535, which is a division of application No. 09/491,165, filed on Jan. 26, 2000, now Pat. No. 6,402,048.

(51) Int. Cl.
- *A01G 25/00* (2006.01)
- *B67D 5/38* (2006.01)
- *B05B 1/08* (2006.01)

(52) U.S. Cl. .............. 239/63; 239/69; 239/74; 239/101; 239/201; 239/227; 239/263.1; 239/263.3

(58) Field of Classification Search .......... 239/63, 239/67, 68, 69, 101, 263.1, 263.3, 380, 210, 239/201, 200, DIG. 15, 578, 583, 227, 20, 239/576, 74

See application file for complete search history.

(56) References Cited

U.S. PATENT DOCUMENTS

| 4,186,880 A | 2/1980 | Jacobi et al. | 239/177 |
| 5,280,854 A | 1/1994 | Das | 239/227 |
| 6,402,048 B1 * | 6/2002 | Collins | 239/63 |
| 6,688,535 B2 * | 2/2004 | Collins | 239/63 |

OTHER PUBLICATIONS

Stephen W. Smith, *Landscape Irrigation Design and Management*, 1997, pp. 180-195.

* cited by examiner

*Primary Examiner*—Christopher S Kim
(74) *Attorney, Agent, or Firm*—Allston L. Jones

(57) ABSTRACT

The present invention includes a unique irrigation sprinkler system with a unique sprinkler head design; a unique method of defining the planted area to be served by the sprinkler head; a unique method for determining when that planted area needs to be watered; a unique way of providing even coverage throughout the planted area when being watered; the ability to use one sprinkler head to individually water multiple, non-overlapping planted areas; a unique way of addressing multiple sprinkler heads in the same sprinkler system; and a unique method for remotely determining the integrity of the sprinkler system.

9 Claims, 24 Drawing Sheets

ACCURATE HORTICULTURAL SPRINKLER SYSTEM AND SPRINKLER HEAD

CROSS REFERENCE

This is a divisional of a application of the same title having Ser. No. 10/134,340 filed Apr. 25, 2002 (now U.S. Pat. No. 6,688,535, issued Feb. 10, 2004) which is a divisional of Ser. No. 09/491,165, filed Jan. 26, 2000 (now U.S. Pat. No. 6,402,048, issued Jun. 11, 2002).

FIELD OF THE INVENTION

The present invention is for a sprinkler system and a sprinkler head design, namely, a sprinkler system having one low pressure water feed line that serves a plurality of individually actuated and programed sprinkler heads. The individually programed and actuated sprinkler heads make it possible to deliver an accurate amount of water at a frequency desired for the specific type of plant being served by the individual sprinkler head.

BACKGROUND OF THE INVENTION

One of the major problems with horticultural sprinkler systems using the presently available components is devising a system design that provides the appropriate amount of water with the proper frequency for all of the various plants in the area to be automatically sprinkled. Some plants need deep watering while others require shallow watering; others require that the foliage not be wet during sprinkling to minimize the development of various diseases and infestations, while other plants are immune to such infestations or require wetting of the foliage during watering; some plants require watering daily or on alternate days particularly in warm or hot weather, while others are drought tolerant and need watering only once or twice a month. Then there are those plants that require protection from frost in cold weather while others do not. And how do you deal with a tropical plant that requires heavy and frequent watering that is planted in close proximity to drought tolerant plants that only require sparse watering, or different soil types which occur throughout a large planted area? These are very serious problems that may not be solvable with the present sprinkler equipment and controls that are currently available once the landscaping has been established.

Due to problems such as those recited above, in today's market one's landscaping and sprinkler system are usually designed and installed simultaneously so that all of the plants served by each circuit of the sprinkler system have similar watering requirements. Thus, sprinkler systems that are currently in use today require multiple watering circuits and various types of sprinkler heads with various coverage patterns.

It would be desirable if there was a horticultural sprinkler system that had none of the drawbacks of those presently available, and particularly a system that can just as readily be installed in an established landscaped area as together with the installation of new landscaping. Even more desirable would be a sprinkler system that easily permitted the introduction or removal of plants throughout the landscaped area and corresponding reprogramming of sprinkler heads, or even the enlarging of the landscaped area. A system that provides unrestricted creativity in the selection and placement of types and species of plants would also be very desirable. In addition it would be desirable to have a sprinkler system that requires the least number of parts, particularly different types, styles and coverage pattern sprinkler heads, preferably a single style sprinkler head. The present invention meets all of these requirements.

SUMMARY OF THE INVENTION

The present invention presents a unique irrigation sprinkler system with a unique sprinkler head design; a unique method of defining the planted area to be served by the sprinkler head; a unique method for determining when that planted area needs to be watered; a unique way of providing even coverage throughout the planted area when being watered; the ability to use one sprinkler head to individually water multiple, non-overlapping planted areas; a unique way of addressing multiple sprinkler heads in the same sprinkler system; and a unique method for remotely determining the integrity of the sprinkler system.

Each sprinkler head of the present invention irrigation sprinkler system is disposed to be coupled to the same water feeder line to deliver water to a planted area of interest. Each sprinkler head of the present invention includes an input port disposed to be coupled to the water feeder line with a control value coupled to the input port to provide controlled water flow through the control valve to the interior of the sprinkler head. In addition there is a flow rate monitoring unit adjacent the control value to monitor the water flow rate as it exits the control valve for delivery to a nozzle with a proximate end adjacent the flow rate monitoring unit to receive the water flow from the control valve and to expel the water from the distal end of the nozzle to the planted area of interest. The sprinkler head further includes a drive means affixed to the nozzle for angularly positioning the distal end of the nozzle, and an angular position monitoring unit to determine the position of the drive means. To control the operation of the various components of the sprinkler head, there is also a sprinkler head control subsystem coupled to the control valve, the flow rate monitoring unit, the drive means and the angular position monitoring unit to monitor and control the water flow rate through, and the angular position of, the nozzle to deliver water to the planted area of interest.

One embodiment of the flow rate monitoring unit could include a flexible finger having a proximate end mounted to a fixed position relative to the water flow and a distal end extending into the path of the water flow. In this embodiment, the distal end of the flexible finger is in a relaxed position when the water flow rate is zero and a displaced position when the water flow rate is non-zero, with the extent of the displaced position being directly related to the water flow rate. Additionally there is a magnet mounted at either a fixed position adjacent the distal end of the flexible finger or on the distal end of the flexible finger. Working in cooperation with the magnet, there is a flow rate magnetic field sensor at the other position adjacent the magnet to provide an electrical signal that is directly related to the strength of the magnetic field detected from the magnet. The strength of that detected magnetic field in turn is strongest when the water flow rate is zero and of decreasing strength the greater the water flow rate, i.e., the signal strength is greatest when the magnet is closest to flow rate magnetic sensor with the signal strength deceasing the further apart the magnet and the flow rate magnetic sensor are from each other.

An embodiment of the angular position monitoring unit similarly includes a magnet mounted at either a fixed position adjacent the drive means or on the drive means. The corresponding angular position magnetic field sensor is then mounted at the other location with the angular position magnetic field sensor providing the strongest electrical signal when the magnet is adjacent the angular position magnetic field sensor to define the zero degree angular position for the nozzle. The zero position is then determined before the control subsystem causes the drive means to operate between selected angular positions in the delivery of water to the planted area of interest.

The overall sprinkler system of the present invention, as stated above, provides water from a water source to the planted area of interest, with the sprinkler system including a water feeder line disposed to be coupled to the water source which could provide water from a marginal water pressure, perhaps as low as 20 psi (pounds per square inch) or normal city water system pressures in the range of 60 to 90 psi, or at even higher pressures. Coupled to that water feeder line is at least one a sprinkler head of the type discussed above, or equivalent to that sprinkler head. Additionally, each sprinkler head is individually electrically controllable during the watering cycle to continuously vary the angular position of, and the water flow rate through, the nozzle to the planted area of interest to provide even coverage of that area. The overall system also includes a power and data line coupled to each of the sprinkler heads to provide power and control data to each one from a master controller disposed to be connected to a power source and coupled to the power and data line to provide power and control data to the sprinkler heads and other elements of the system.

In sprinkler system of the present invention each sprinkler head can be individually programed either from the master controller or remotely with a programing unit that plugs into the sprinkler head that is to be programed. Two embodiments are included to accomplish that programing. In the first embodiment, an optional remote programing unit is provided. In the second embodiment, the master controller is divided into a power hub and a detachable programing unit that is plugged into the power hub when not in use remotely at one of the sprinkler heads. In the first of these embodiments, both the master controller and the remote programing unit includes a display and keyboard for the user to program each sprinkler head. Whereas in the second embodiment, the keyboard and display are only included in the detachable programing unit which is possible since the keyboard and display are only needed at one or the other location when a sprinkler head is being programed. The display and keyboard are also useful at the master controller location when in normal operation of the sprinkler system for displaying time or status of the system or for use by the user to inquire about various functions and status of the system.

Additionally there is an optional weather station coupled to the power and data line to provide weather related data to the master controller. That data might include temperature, humidity, wind direction and strength, etc.

Another element of the present invention is a method of watering a contiguous planted area of interest with a processor controlled automatic sprinkler head as described above connected to a water line with that water being delivered through the nozzle. That is accomplished by selectively oscillating the particular sprinkler head from side to side to direct the water stream from the nozzle from side to side within the planted area of interest under control of the processor. In coordination with the back and fourth oscillation of the nozzle, the water flow rate through the nozzle is selectively varied to direct the water from the nozzle at varying distances from the nozzle within the planted area of interest. Alternately, the flow rate through the sprinkler head could be varied to direct the water stream in and out (closer and farther) from the sprinkler head while coordinating the angular position of the sprinkler head to direct the water stream throughout the planted area of interest. Using either of these techniques, water is directed to the planted area of interest in a in a zig-zag fashion to cover the entire planted area of interest.

The method of programing each sprinkler head for delivery of water to a planted area of interest is also unique, as is the method of determining when and how much water to deliver to the planted area of interest. First, the area of interest must be determined and programed into the corresponding sprinkler head. Typically the shape of that area will be a point, a line, a triangle or a multi-sided polygon in which case, one, two, three or more points, respectively, with corresponding electronic signal values that define the point, ends or corners of the area of interest must be programed into the sprinkler head. For each point, a value corresponding to an electrical signal to positions the nozzle at the angular position where the water from the nozzle is in the direction of the point, and a value corresponding to the electrical signal to control the flow rate through the nozzle to direct the water the necessary distance from the sprinkler head to the point, are stored in local memory in the sprinkler head. The values of the necessary angular and distance positions are determined by the use, either with the master controller or with a unit remotely at the sprinkler head first initiates water flow from the nozzle, and then using the keyboard adjusts the angular position of, and the water flow rate from, the nozzle until the stream of water hits the point in question. In each case, a save function is initiated to save values that define the point such that the local processor of the sprinkler head can repeatedly direct a water stream to it. Once all of the values for necessary points to define the area of interest are entered, the local processor is prepared to deflect the stream of water from the nozzle throughout the area of interest at the single point, along the line defined by two points, or within the line segments that connect to points at the three or more corners, when the master controller instructs the local processor to proceed. That being done, the water flow is stopped until the master controller instructs that it be restarted.

Another unique feature of the present invention is the determination of how much water to deliver to the planted area of interest when the local processor of the sprinkler head is instructed by the master controller to water that area. Also during the programing of the area of interest into the sprinkler head, the dose (number of inches) of water that is to be delivered in a single watering cycle is input to memory along with the corner definitions. Then, using the corner definitions, the area (number of square feet) of the planted area of interest is calculated by the local processor. Then, knowing that area, the dose and the nominal flow rate through the nozzle for the various points, the local processor calculates the length of time needed to evenly deliver the desired dose throughout the planted area of interest. That time is then also stored in memory in the sprinkler head.

If the planted area of interest is a single point, then a nominal area is used as the area of the planted area of interest for the watering duration calculation. Similarly, if the planted area of interest is a line, then the area of the planted area of interest is calculated by multiplying the distance between to the two points the define the ends of the line by a nominal width for the duration calculation.

Then to get even coverage throughout the planted area of interest the stream of water is varied throughout the area by a technique such as zig-zagging the stream of water.

The method for determining when each area of interest needs to be watered also requires that two additional pieces of data be known: a stress tolerance level in inches of water (the number of inches of water loss that a plant can withstand before experiencing damage) for the plants in the area of interest, and a typical value of the evapotransporation rate ($ET_0$) in the geographic area where the planted area is located. That stress tolerance level is entered and saved in the sprinkler head by the user when programing for dose and the points that define the area of interest. Since $ET_0$ is dependent on the weather in the geographic area where the sprinkler system is located, the same $ET_0$ is used for calculating when watering is needed by all of the planted areas of interest served by the sprinkler system, thus $ET_0$ is preprogramed into the master controller, or is determined by the master controller as needed.

With those values being available, it is possible to determine at any particular time whether each planted area of interest being served by the sprinkler system needs to be watered. This is done by the master controller sending each sprinkler head attached to the sprinkler system the $ET_0$ for that point in time to be used in the calculation to determine if watering is needed. Each local processor of each sprinkler head then subtracts the $ET_0$ value either from the programed stress tolerance level or the results of a previous one of these calculations which has been stored as the effective stress value. The resulting effective stress value is then updated in memory to the value just calculated. Next the local processor determines if the effective stress value is zero or a negative value. If so, the corresponding area of interest requires watering for the period of time determined based on the square footage of that area and other values.

The next step in the watering process is for each local processor to communicate the number of minutes that are required by that sprinkler head to water those areas that have reached the zero or negative threshold. Knowing the number of sprinkler heads that need to water and the length of time need by each, the master controller calculates the maximum number of sprinkler heads that can be active at the same time using the information provided by the sprinkler heads and knowing the available water pressure of the water line. Next the master controller prepares a sequence of steps for activating the ready sprinkler heads with no more than the determined maximum number sprinkler heads in each step of the sequence using the maximum number and the individual watering cycle durations needed by the sprinkler heads that are ready to water. Then the master controller communicates individually with each sprinkler head at the beginning of each sequence step in which that sprinkler head has been included to commence watering for a predetermined period of time until all sequence steps have been completed. Then when each sprinkler head has completed watering, for those areas of interest that have just been watered, resets the stored effective stress value to the stress tolerance level programed into the sprinkler head by the user.

Another feature of the present invention is a technique for determining the integrity of the automatic sprinkler system at any time. To do so, each local processor is programed to report to the master controller: an inability to water an area when authorized to do so by said master controller; and when there is water flow through the corresponding sprinkler head at a time when unauthorized to initiate water flow. Additionally, the master controller individually interrogates each local processor in each sprinkler head at will to request an acknowledgment from each local processor as being on-line. From the information provided by the local processor, or processors, by the lack of a response to the individual interrogations, the master controller is able to identify a possible problem and the sprinkler head where that problem is located.

DETAILED DESCRIPTION OF THE INVENTION

Figure 1:
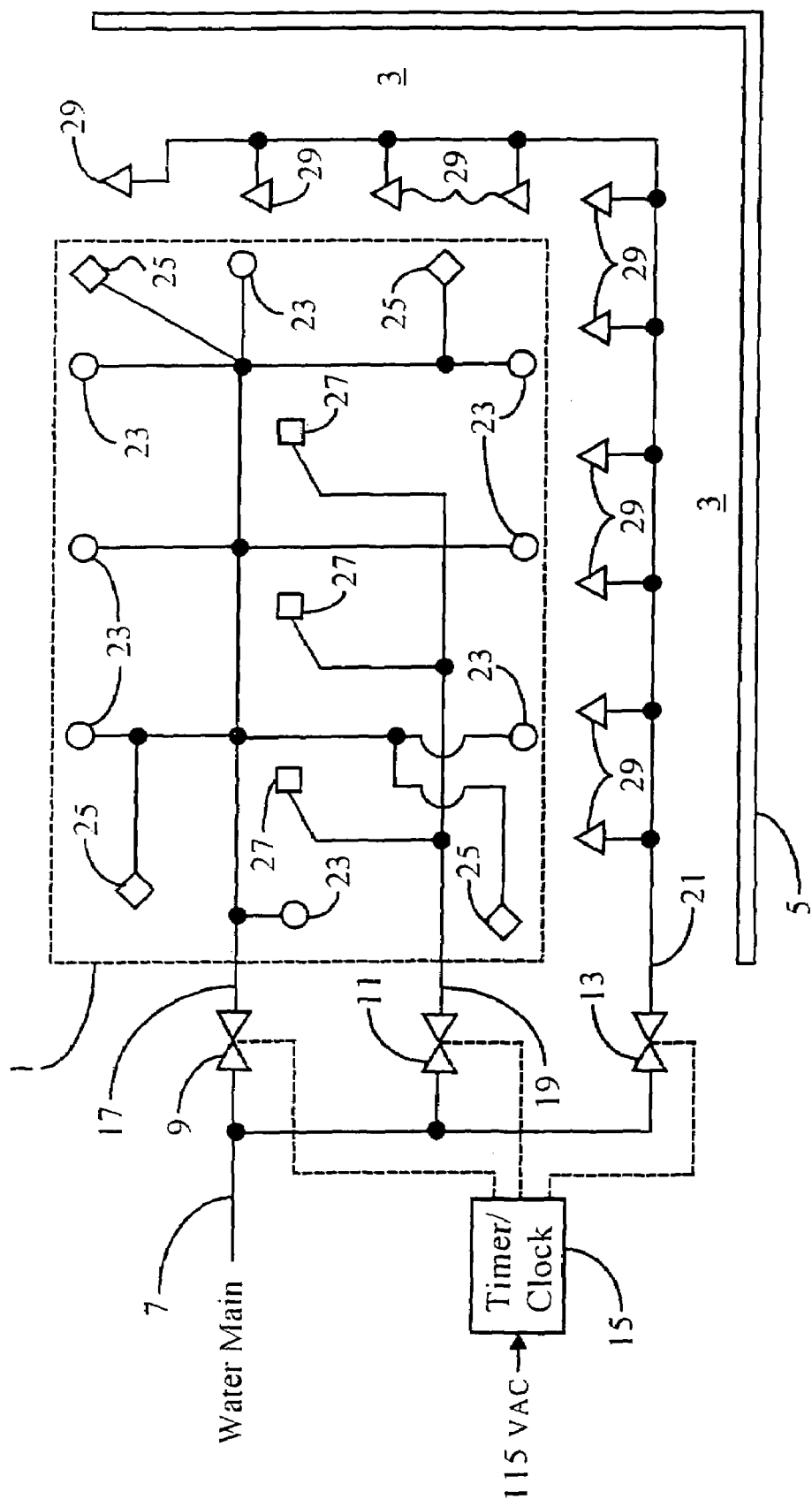
FIG. 1 is a line drawing representation of a typical interconnection of the various components of a horticultural sprinkler system of the prior art.

FIG. 1 shows a typical prior art horticultural sprinkler system installation in a residential backyard that is perhaps no bigger than an area of 30 feet by 75 feet. There is a central, substantially rectangular lawn area 1 with a planted edge area 3 which borders two sides of a fence 5. Given the shape and size of the lawn 1, to achieve full coverage when watering, it is typically necessary to provide both perimeter and central sprinkler heads. Once that is determined it is necessary to determine what angular coverage must be provided by each sprinkler head, the necessary minimum water flow rate through each sprinkler head, and the minimum water pressure level that is required to achieve the desired coverage. For the example in FIG. 1, two separate water circuits are shown for watering lawn 1 taking into account the available water pressure, and the angles of coverage and the necessary flow rates of each sprinkler head. One water circuit 17 is provided for the sprinkler heads located around the perimeter of lawn 1, and the second water circuit 19 is provided for the sprinkler heads located in the central area of lawn 1.

Then for watering the plants in edge 3, it is also necessary to determine how many sprinkler heads of what type and coverage are need. Then it must be determined if a separate water circuit is needed to support the sprinkler heads for edge 3 either due to lack of sufficient pressure to include them with one of the lawn circuits, or because the sprinkler time and frequency will be different than for the lawn area. Typically shrub and flower plantings require watering less frequently than does a lawn. If it is determined that the plants in area 3 will have the same watering time and frequency as lawn 1, then it must be determined that there is sufficient water pressure in either of the two water circuits for watering the lawn 1 to support the additional sprinkler heads needed for area 3. If there is sufficient water pressure in either, or both, lawn watering circuits and the watering time and frequency are to be the same, then some of the necessary sprinkler heads can be included in one or both of the lawn watering circuits. However, since the watering time and frequency for edge plants is typically different than that for a lawn, thus a separate watering circuit 21 is necessary, regardless as to whether or not there is sufficient water pressure in one of the other circuits to support the sprinkler heads for edge 3.

For simplicity of the example of FIG. 1 there are only three watering circuits 17, 19 and 21 illustrated, however, given typical residential water pressure and the minimum pressure needed for typical sprinkler heads, more typically there will only be 8 to 10 sprinkler heads in each watering circuit. Thus, a lay out as shown in FIG. 1 could easily require a total of five or six watering circuits.

The overall system of FIG. 1 includes the water being supplied by water main 7 to all three electrically activated control valves 9, 11 and 13, one for each of the watering circuits 17, 19 and 21, respectively. The electrical activation of each of control values 9, 11 and 13 is individually provided by an electrical signal from timer/clock 15 on preselected particular days of the week, times of day and duration of each watering cycle for each circuit. Due to water pressure limitations and the usual design of such water circuits, nearly all of the available water pressure is needed for a single watering circuit, thus only one valve is actuated for any period of time, with perhaps each valve being actuated sequentially when the operational period for a previous water circuit has been completed, i.e., no two water circuits will be operating at the same time.

Note that in FIG. 1 the individual sprinkler heads are indicated with four different symbols, namely a circle, a diamond, a square and a triangle. In water circuit 17 note that there are two sprinkler head types included, a first sprinkler head type 23 shown as a circle to indicate that the spray pattern provided is 180°, and a second sprinkler head type 25 shown as a diamond to indicate that the spray pattern provided is 90°. Then in water circuit 19 there is only one sprinkler head type included, a third sprinkler head type 27 shown as a square to indicate that the spray pattern provided is 360°. The fourth sprinkler head type 29 is included in water circuit 21 and is shown as a triangle to indicate that it has a very localize spray pattern, perhaps it is only the drip type of head.

Figure 2A:
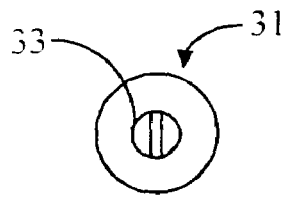
FIGS. 2a and 2b are top and side views, respectively, of the passive type of sprinkler head of the prior art.
Figure 2B:
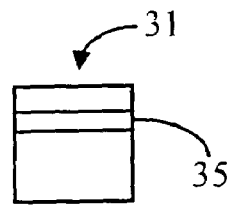
Figure 3A:
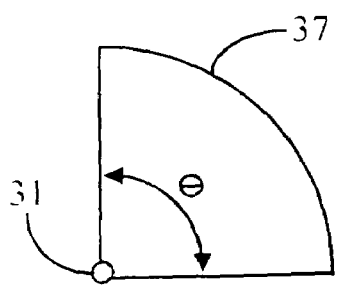
FIGS. 3a-3d are representations of typical coverage patterns available with various types of sprinkler heads of the prior art.
Figure 3B:
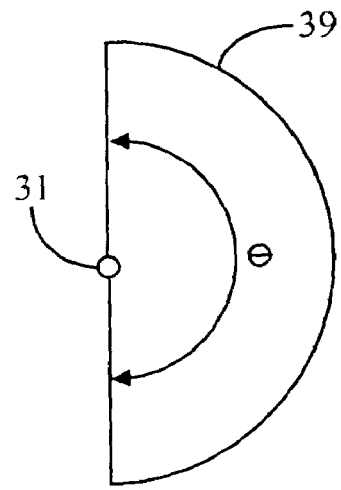
Figure 3C:
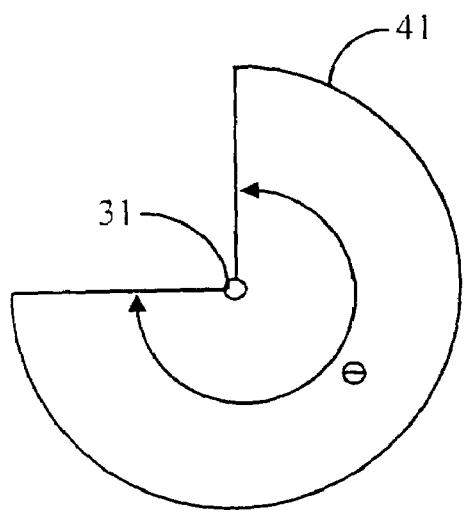
Figure 3D:
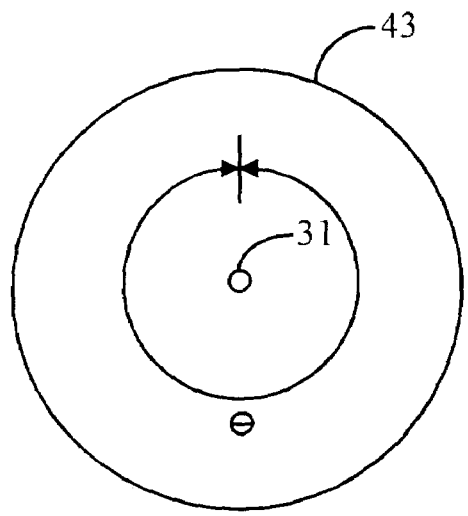

FIGS. 2a and 2b illustrate top and side views of typical passive type sprinkler head 31 that is currently available. Passive sprinkler head 31 includes a pressure adjusting screw 33 on top of head 31 which is adjusted when the watering system is installed to set the distance of the spray that is provided by that individual sprinkler head. In the side view, spray port 35 is shown to provide the water spray at the selected angle. FIGS. 3a-3d show that sprinkler heads 31 can be obtained with different spray angles θ: FIG. 3a with substantially a 90° spray angle to provide a maximum coverage area 37; FIG. 3b with substantially a 180° spray angle to provide a maximum coverage area 39; FIG. 3c with substantially a 270° spray angle to provide a maximum coverage area 41; and FIG. 3d with substantially a 360° spray angle to provide a maximum coverage area 43. In addition there are sprinkler heads of this type available that permit the adjustment of spray angle θ within a limited range to provide more specific angular coverage where the planting or lawn angles are not multiples of 90°.

Figure 4A:
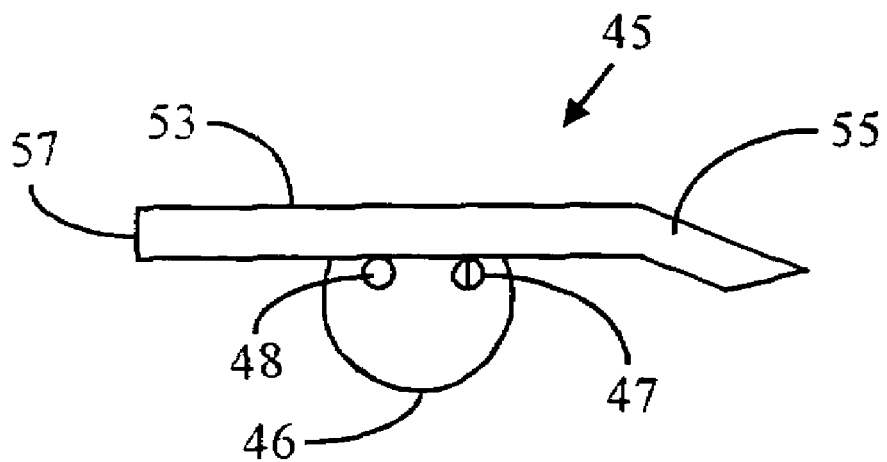
FIGS. 4a and 4b are top and side views, respectively, of the impulse type of sprinkler head of the prior art.
Figure 4B:
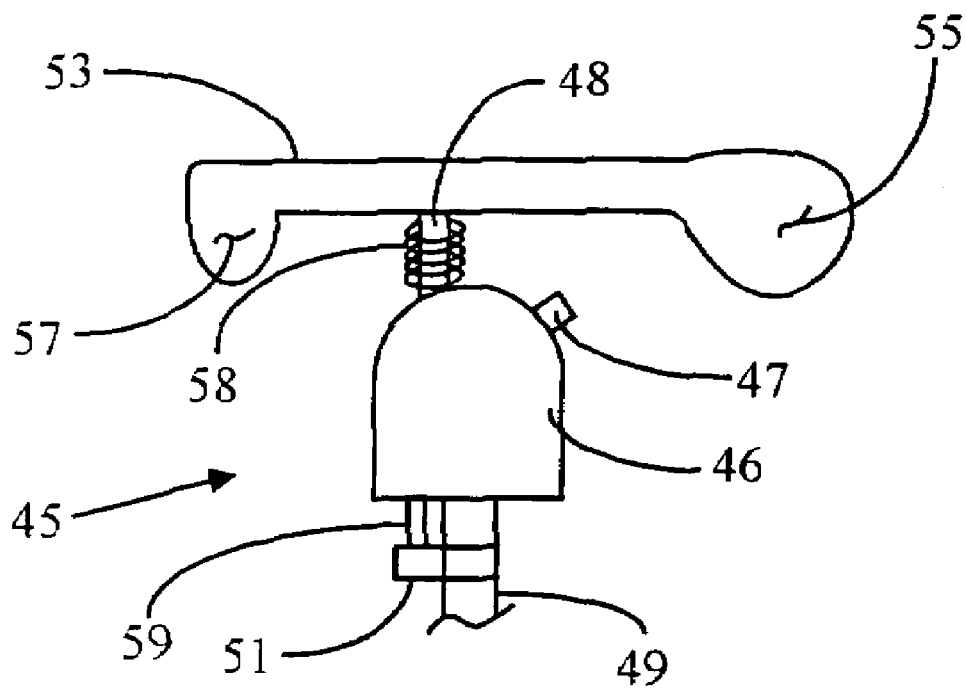

A second type of sprinkler head that is currently available is the impulse type which is shown in top and side views in FIGS. 4a and 4b. Impulse sprinkler head 45 includes a head 46 that is swivelly mounted on a water feeder stem 49 that is plumbed into a water circuit. Located approximately 45° down from the top of head 46 is a water nozzle 47 from which the water sprays during use. Extending out of the top of head 46 is a shaft 48 on which is mounted impulse arm 53 and a return spring 58. At the end of impulse arm 53 proximate water nozzle 47 is a water finger 55 and at the distal end from water nozzle 47 is a weight 57. Water finger 55 is angled to extend immediately in front of the water spray from water nozzle 47 so that in use the water spray strikes on water finger 55 forcing impulse arm 53 to rotate away from the water stream from water nozzle 47 (as shown in FIG. 4a impulse arm 53 rotates counter clockwise, alternately if the configuration of impulse arm is a mirror image of that shown and mounted to the other side of water nozzle 47 the motion will be in the clockwise direction) through an angle determined by several factors including water pressure, tension of spring 58, size of weight 57, the friction between head 46 and stem 49, and other factors, dragging head 46 in the same direction to a new position on stem 49. Once the motion of impulse arm 53 stops, return spring 48 causes the impulse arm to rotate back in the opposite direction bringing water finger 55 again in the path of the water spray which again causes a partial rotation of head 47. Thus, if no stops are incorporated that would stop the rotation of head 46, head 46 would continue to rotate in small steps so long as water pressure is provided via stem 49. For installations where less than 360° coverage is desired, two angularly adjustable stops 51 are provided on stem 49 against which stop finger 59 on head 46 comes into contact at the end of a rotation in that direction. Once stop 51 in the forward direction is encountered, the angle through which impulse arm 53 can move is restricted, virtually keeping water finger 55 in the water stream from nozzle 47, thus forcing head 46 to rotate in the opposite direction until finger 59 reaches the starting point rotation stop and then the above described operation resumes with head 46 then again rotating in the first described direction with the operation continuing to proceed and reverse repeatedly as described.

Impulse sprinkler heads 45 are usually used in installation situations where coverage is needed in larger areas where one impulse sprinkler head would replace many of the other type of sprinkler heads, e.g., in a golf course or large park setting. Even so, various water circuits are still needed and with the larger coverage area of each impulse sprinkler head one is even more limited to the use of a variety of plantings with a variety of watering needs.

Thus it can be seen that the prior art watering systems require that planting patterns be considered at the same time that the sprinkler system is installed, and are very rigid and fixed once installed. Once such a system is installed the plant types cannot be easily changed, nor can a new plant type with different watering needs be placed where the watering provided may be too little, too much, too often or not often enough. Also additional sprinkler heads cannot be added later to a water circuit without effecting the water pressure delivered to each existing sprinkler head, thus making it necessary to add yet another water circuit to accommodate the changes. In addition, the prior art sprinkler systems require the use of at least six different sprinkler head types, even more if drip irrigators are included among the choices. Prior art sprinkler systems are clearly rich in the numbers of different components that one must consider using in designing prior art sprinkler systems installations. Thus the existing watering systems stifle creativity in locating and mixing plant types within a particular area, and just as importantly, stifle the changing and adding of plants in an area after the sprinkler system has been designed and installed.

The watering system of the present invention provides for total creativity and flexibility, works with water lines of any pressure, including marginal pressure below that of city water systems, does not require the use of multiple watering circuits, permits the addition or deletion of sprinkler heads at any time in any area, accommodates differing watering patterns, automatically varies watering frequency from sprinkler head to sprinkler head, calculates when watering is needed in each planted area and can accommodate changes, as well as the addition of sprinkler heads and/or planted areas to be watered, as well as the removal of one or more sprinkler heads, at any time after the watering system is installed.

Figure 5:
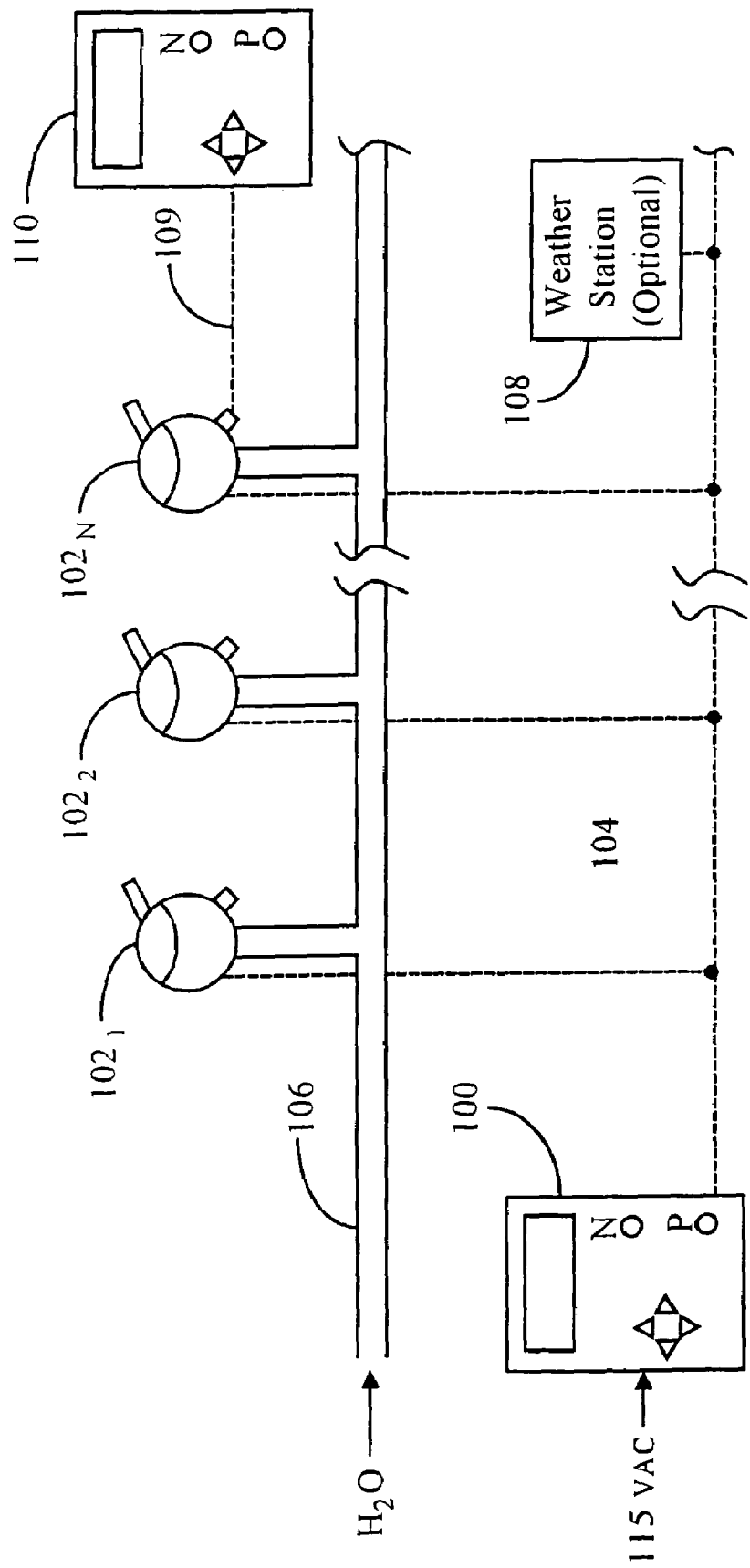
FIG. 5 is a typical interconnection diagram of the various components of the horticultural sprinkler system of the present invention.

FIG. 5 shows a simplified installation of a watering system of the present invention that is representative of every sprinkler system installation using the present invention components. Such a system consists of three basic components: a controller 100 with a display and keyboard, sprinkler heads $102_1, 102_2 \ldots 102_N$, and a water main 106. From FIG. 5 it can be seen that all of sprinkler heads $102_x$ are each connected to the common water main 106 and controller 100 by a common low voltage electric power/data line 104 (e.g., two or three wires).

Two optional components are also shown in FIG. 5, namely weather station 108 connected to low voltage electric power/data line 104, and remote programing unit 110 with a data line 109 with a plug that mates with a jack in the side of sprinkler head 102. Weather station 108 can provide temperature, dew point, wind speed, humidity, evaporation rate, frost/freeze level information to controller 100 so that the time, frequency and flow rates of individual ones of sprinkler heads $102_x$ can be adjusted for particular weather conditions which may adversely effect the plantings that the individual sprinkler head $102_x$ serves. Alternatively, some or all of the functions of weather station 108 can be included within some, or all, of sprinkler heads 102 to provide information to the internal electronics that the sprinkler head needs to best serve the plantings addressed by that specific sprinkler head.

Remote programing unit 110 also includes a display and keyboard similar to those included with controller 100. Remote programing unit 110 is basically provided as a convenience for the user since all of its functions can also be performed from controller 100. For example, when an additional sprinkler head $102_x$ is added to the system by connecting it to power/data line 104 and water main 106, the plant type, planting dose and stress levels, the area to be covered (i.e., flow rate and angle of oscillation variations), etc., for that specific sprinkler head $102_x$ must be programed into the system. Since some experimentation may be necessary to adjust the water flow rate and angle of oscillation for each individual sprinkler head $102_x$, the user may find it more convenient to be able to do the programing in close proximity to the sprinkler head rather than having to go back and forth between the sprinkler head of interest and controller 100. The operation and programing of sprinkler head $102_x$ will be discussed further below after introducing the operational components and construction of the sprinkler head 102 of the present invention.

Figure 6:
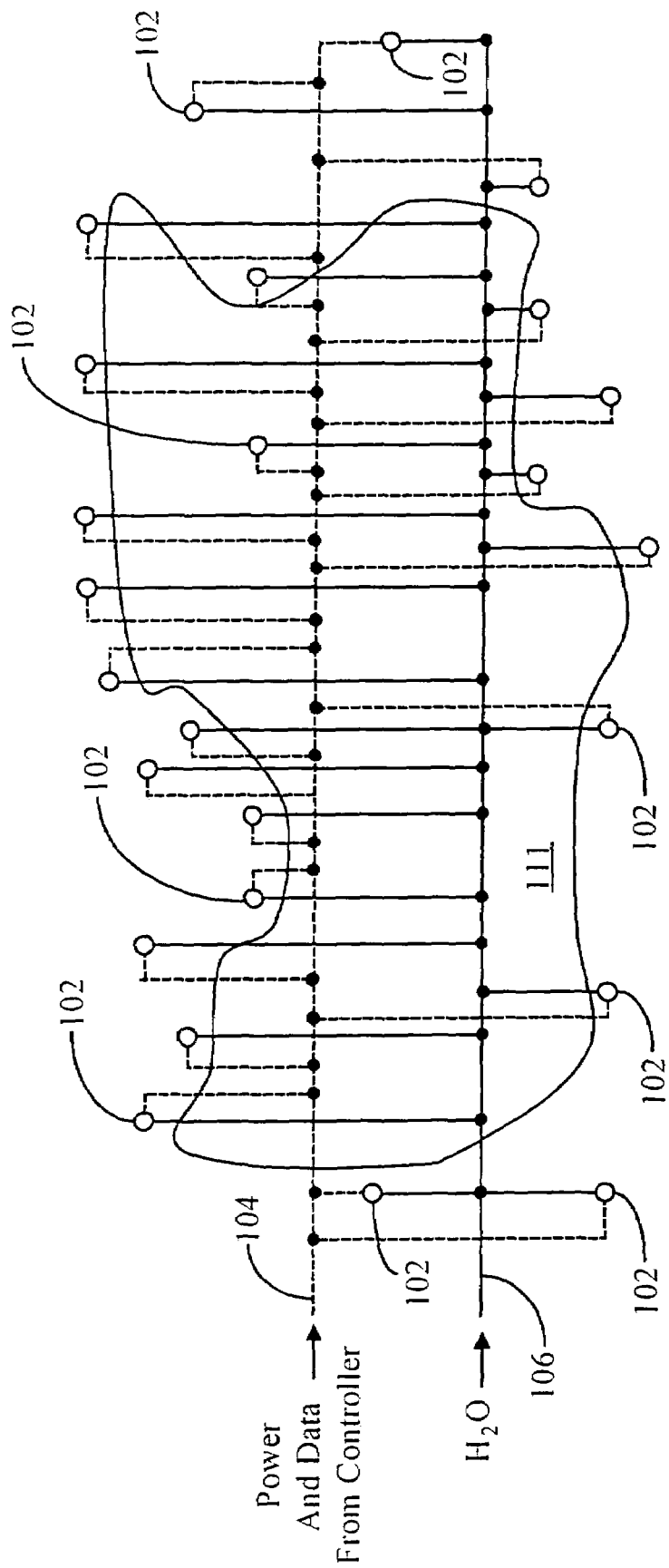
FIG. 6 is a line drawing representation of a typical interconnection of the various components of a horticultural sprinkler system of the present invention.

FIG. 6 shows what might be a more typical installation for the sprinkler system of the present invention. Here there is an irregular planted area 111 which might have the same plants occupying the entire area, e.g., a lawn, putting green, fairway, rough or tee area. Then surrounding area 111 there may be any variety of different plants of varying types and sizes. Area 111, as well as the surrounding free planted area, are both served by the plurality of individually programed sprinkler heads $102_x$ that are all connected to the same water main 106 and the same electric power/data line 104 from one controller 100. Additionally, the present invention can also be used to water adjacent irregular areas which each have a different species or type of plant occupying the same area, e.g., a golf courses with various types and lengths of grasses in each area, with perhaps various free planted areas at random locations with everything being served by the same single water main 106 and a single controller 100 and corresponding electric power/data line 104.

Figure 7:
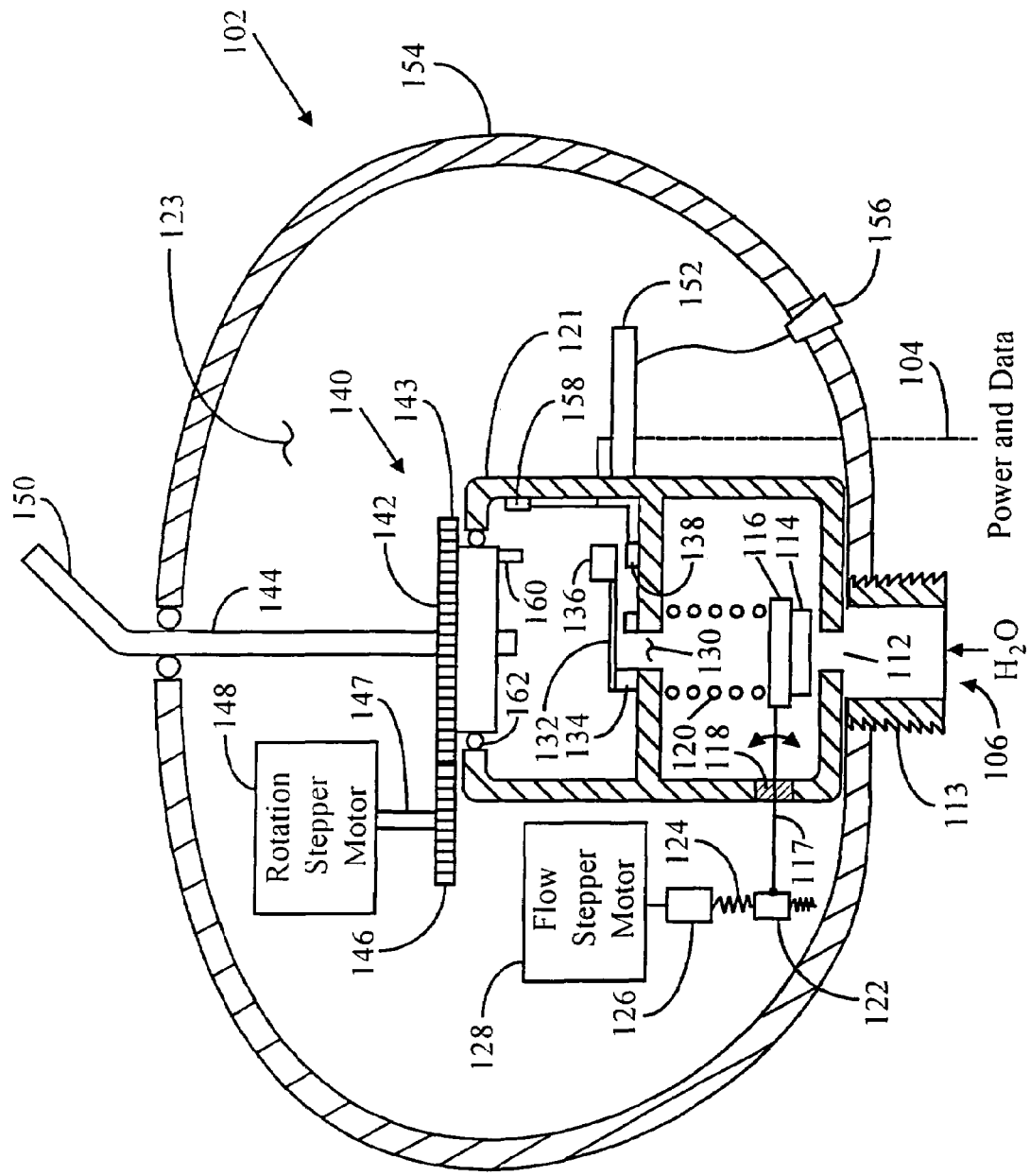
FIG. 7 is a cross-sectional and block diagram representation of the mechanical relationship of the various components of a sprinkler head of the present invention without the details of the electrical interconnections within the sprinkler head.

FIG. 7 is a combined cross-section/block diagram of a first embodiment sprinkler head 102 of the present invention. A threaded port 113 is provided to plumb sprinkler head 102 to water main 106 by means of a riser and couplers as necessary to deliver water to washer seat 112, and then into water chamber 121. Alternately, where the sprinkler water main and risers are made of PVC with various parts glued together, the end shown as threaded port 113 in FIG. 7 can be unthreaded with an inner diameter that is slightly larger than the outer diameter of the riser to which sprinkler head 102 is to be attached so that port 106 of sprinkler head 102 can be glued to the riser in the same way that the other parts are glued together. In a normally closed position, washer 114 abuts washer seat 112 with washer 114 mounted on a movable washer base 116 which is biased in the closed position by return spring 120 pressing downward on the top side of washer base 116. To control the timing and flow rate of water from water main 106 into water chamber 121, affixed to washer seat 116, is one end of a lever arm 117 that passes through water tight seal 118 in the side of water chamber 121 and extends into outer chamber 123. There, the other end of lever arm 117 is coupled to ball-screw follower 122 on screw 124. In turn, screw 124 is coupled to the shaft of flow stepper motor 128 via a flexible coupler 126. Then as ball-screw follower 122 is advanced in one direction or the other as flow stepper motor 128 causes screw 124 to rotate, lever arm 117 in turn causes washer seat 116 to move away from, or closer to, washer seat 112 thus controlling the water flow rate into water chamber 121. The control of flow stepper motor 128 is discussed more fully below. Once water begins flowing through valve seat 112, that water advances to and through nipple 130, passed leaf spring 132 and eventually is expelled from sprinkler head 102 through angled nozzle 150, typically angled at approximately 22° to 45° to horizontal outside outer shell 154, or any other selected angle or adjustable angle to match the location.

One end of leaf spring 132 is mounted on one side of nipple 130 with fastener 134 and extends across the opening of nipple 130. Mounted on the top side of the opposite end of leaf spring 132 is a small permanent magnet 136 with a flow Hall sensor 138 mounted at a fixed location adjacent the opposite end of leaf spring 132. In the quiescent state with no water flowing through water chamber 121, magnet 136 is biased into close proximity with flow Hall sensor 138. Flow Hall sensor 138 is provided to determine the proximity of leaf spring magnet 136 to itself with magnet 136 being closer when the water flow rate is low and further away as the flow rate increases. Thus, flow Hall sensor 138 provides a signal that is directly related to the flow rate of water through water chamber 121. Once water flows through nipple 130, it advances to nozzle assembly 140 at the top of water chamber 121 and then out nozzle 150 at the rate provided by flow stepper motor 128 in conjunction with flow Hall sensor 138 as will be described more fully below. Note: the location of magnet 136 and flow Hall sensor 138 can be mounted in opposite position to that described above.

Nozzle assembly 140 includes several components with stem 144 of nozzle 150 passing through the center of a circular disk 142. Disk 142 has a portion thereof that extends through washer 162 into the top portion of water chamber 121 and is captured in that position with freedom to rotate continuously in either direction through 360°+ with no stops to prevent continuous travel in either direction. External to water chamber 121 and within outer chamber 123 (which does not contain pressurized water, and preferably no water), completely around the top edge of disk 142 there is defined nozzle positioning gear teeth 143. Meshing with gear teeth 143 of disk 142 is drive gear 146 which is, in turn, mounted on motor shaft 147 of rotation stepper motor 148. Additionally, at one point on the outer edge of the bottom of disk 142, magnet 160 is mounted at the 0° point of disk 142. Mounted in a fixed position on the inside surface of water chamber 121, opposite magnet 160 when disk 142 is in the 0° position, is position Hall sensor 158. Before sprinkler head 102 begins to spray water from nozzle 150, rotation stepper motor 148 is actuated to turn nozzle gear 142 to position magnet 160 opposite position Hall sensor 158 to initialize the position of nozzle 150 to 0°. That having been done, and the gear ratio between nozzle gear 142 and drive gear 146 being known, the angular position of nozzle 150 is determined during operation by keeping track of the number, and direction, of revolutions of rotation of stepper motor 148. Note: position Hall sensor 158 and magnet 160 can be mounted in the opposite positions to those described above.

Figure 8:
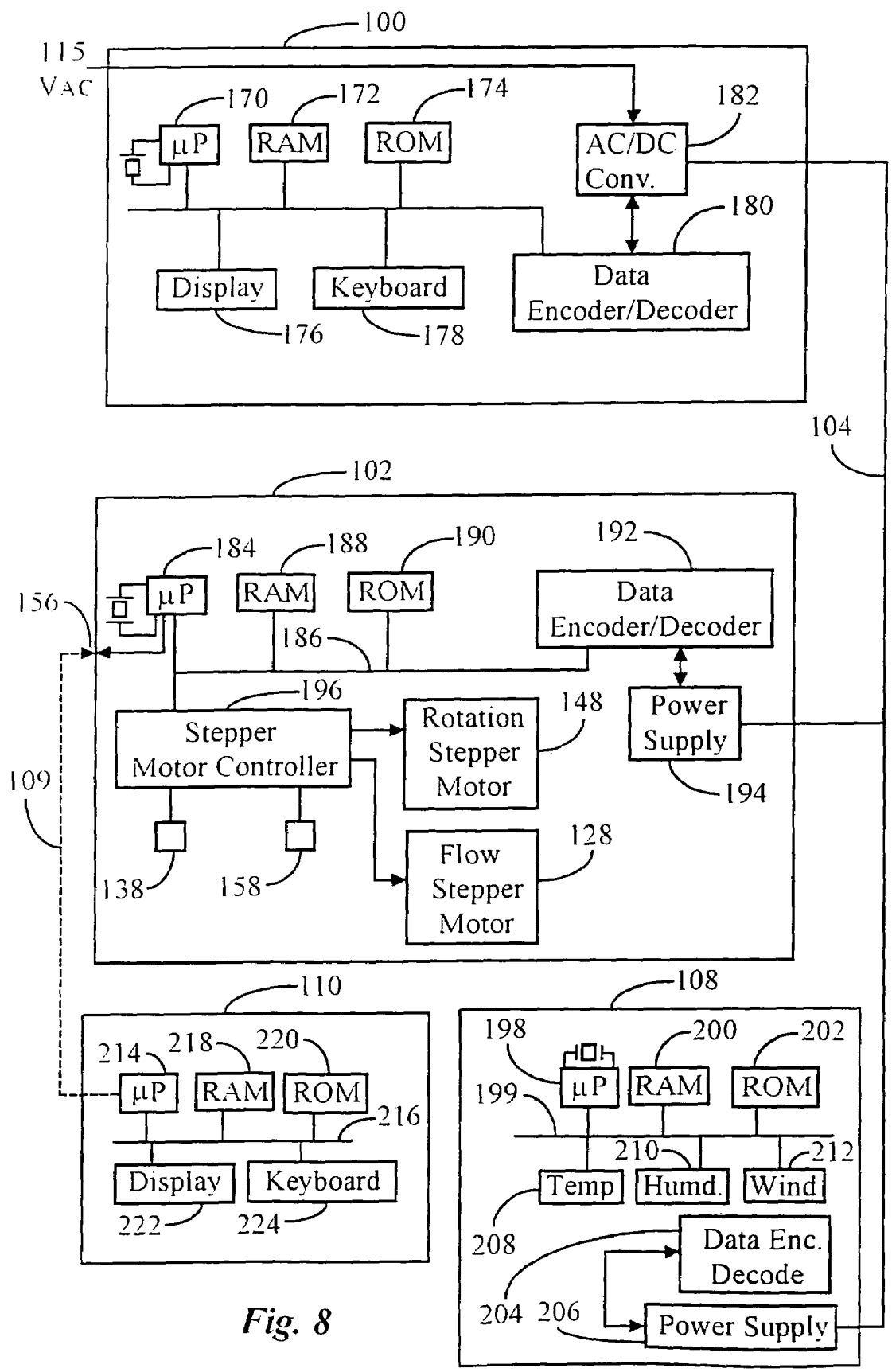
FIG. 8 is a representative interconnection block diagram of a first embodiment of the interconnection of the various electrical components of the present invention.
Figure 9:
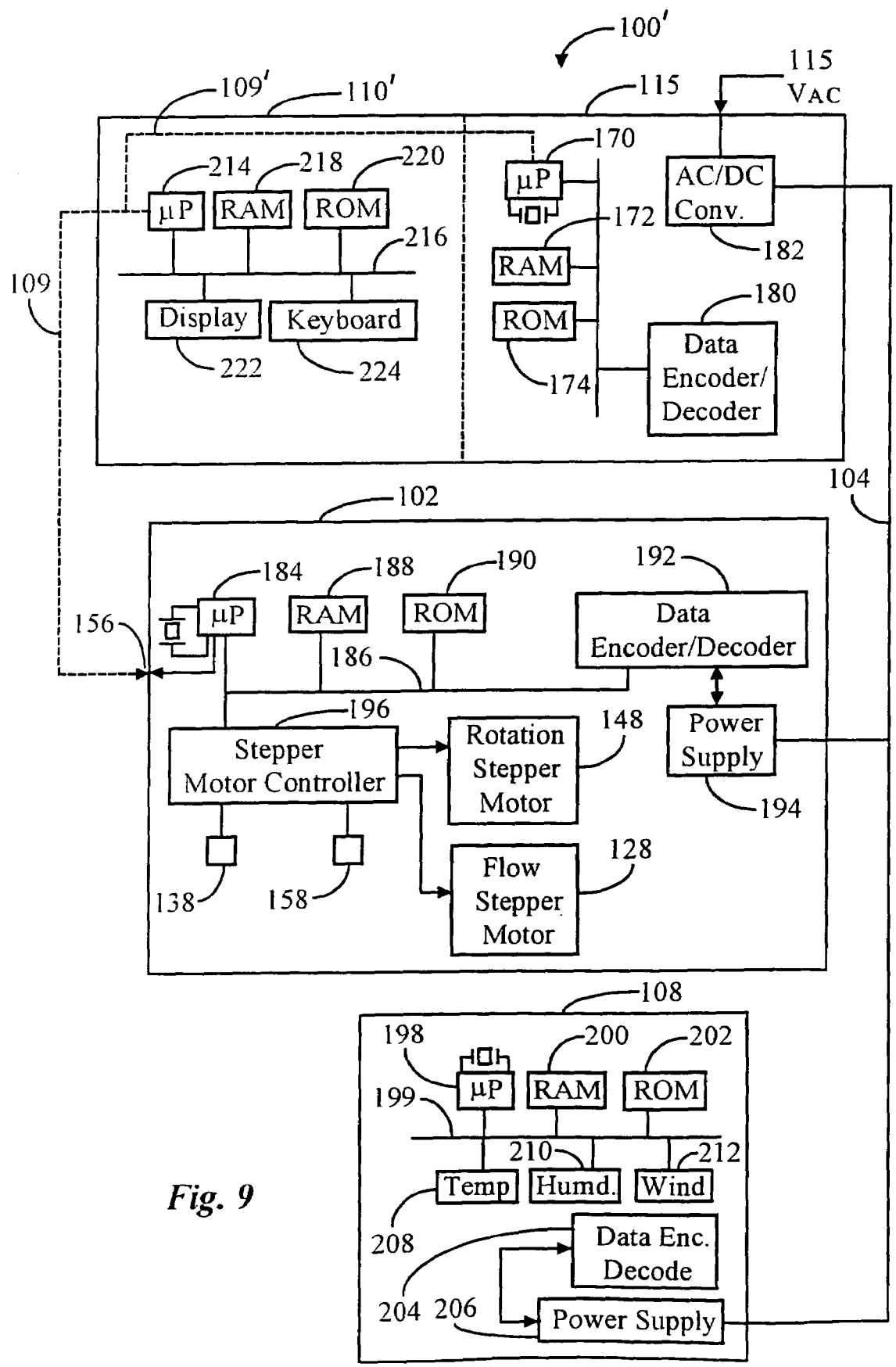
FIG. 9 is a representative interconnection block diagram of a second embodiment of the interconnection of the various electrical components of the present invention.

Also shown in FIG. 7 is a printed circuit board to which all of the electronic components of sprinkler head 102 are attached and/or mounted (details as to what is included is discussed further with respect to FIGS. 8 and 9) with power/data line 104 connected thereto. Additionally, jack 156 is wired to printed circuit board 152 and mounted through outer shell 154 to provide a point of connection for remote controller 110.

FIG. 8 provides a first embodiment of the internal block diagrams for each of the various components of the present invention and the interconnections between those components, including the optional units. Here only one sprinkler head 102 is shown interconnected to the other electronic subsystems of the present invention. Each additional sprinkler head 102 would connect to electric/data line 104 in the same way as does the single sprinkler head 102 shown in FIG. 8 with each of the other subsystems interfacing with all connected sprinkler heads 102 in the same way as shown for the one sprinkler head 102. At the top of FIG. 8 is a block diagram of controller 100 with 115 vAC applied to an AC/DC converter 182 to provide the internal voltage levels for the components within controller 100, as well as a DC voltage level (e.g., 34 vDC) to be applied to electric power/data line 104. Also included in controller 100 is a microprocessor 170 and corresponding crystal oscillator which is connected via internal data bus 171 to RAM 172, ROM 174, display 176, keyboard 178 and data encoder/decoder 180. Data encoder/decoder 180, in turn is connected to AC/DC converter 182 to apply or detect a pulse data signals to/from the DC voltage signal on electric power/data line 104. The encoded data includes identification of the specific sprinkler head 102 to or from which the data is directed or from which it originates. There is further discussion of the pulsed data technique used on electric power/data line 104 below.

Controller 100 is the master control of the entire system of the present invention. As such, microprocessor 170 performs various functions which are controlled by the firmware pre-stored in ROM 174 with RAM 172 containing information, individually, for each sprinkler 102 connected to electric power/data line 104, with that data being loaded into RAM 172 as each sprinkler head 102 is added to the overall system. The data in RAM 172 is initially loaded into the system either from controller 100 via keyboard 178 with user interaction based on information requests presented on display 176. The information for each sprinkler 102 loaded into RAM 172 includes a numerical designation for each sprinkler together with additional information relative to that specific sprinkler head. Display 176 and keyboard 178 could also be used during normal operation of the system to review or edit the settings for each sprinkler head 102, to show the overall status of the system, date and time of day, and temperature and humidity if weather station 108 is included with the system. Then data encoder/decoder 180, under control of microprocessor 170, encodes data on bus 171 for each sprinkler head 102 individually and applies that data to electric/data line 104 for transmission, or to decode incoming data which is then placed on bus 171 for use by microprocessor 170 and storage in RAM 172. In a typical installation, electric/data line 104 that carries 34 vDC modulated with a pulsed data signal that goes to all sprinkler heads 102 and optional weather station 108, if used.

Given the various data relative to each sprinkler head 102, and knowing the available water pressure in water main 106, microprocessor 170 could also calculate the possibility and options of combinations of having more than one sprinkler head 102 activated at the same time without impacting the delivery and coverage of water from each activated sprinkler head 102. Then adjusting the activation times of each sprinkler head 102 accordingly.

The second block from the top of FIG. 8 presents an electrical block diagram representative of the electronics of sprinkler head 102. Included in each sprinkler head is a local microprocessor 184 and corresponding crystal oscillator. Local microprocessor 184 interfaces via data bus 186 with RAM 188, ROM 190, data encoder/decoder 192 and stepper motor controller 196. Here local microprocessor 184 performs various functions which are controlled by the firmware prestored in ROM 190 with RAM 188 being provided for temporary data storage and storage of the data programed into the sprinkler head when the sprinkler head is first installed in the overall system, e.g., sprinkler head number, stress and dose levels and plant type, area to be watered in each pass and the corresponding flow rate of water through, and rotational angle of the sprinkler head when used to deliver water to the programed area. Data encoder/decoder 192 functions similarly to data encoder/decoder 180 of controller 100 interfacing data to and from electric data line 104 in a preset pulse format via power supply 194.

Power supply 194 performs a dual function in sprinkler head 102. First, using the DC voltage level on electric/data line 104 provided by controller 100, power supply 194 provides the operating voltage level for each of the components in the sprinkler head, e.g., 12 vDC and 5 vDC (for simplicity the voltage lines from power supply 194 to each of the other components are not shown). Second, power supply 194 is the conduit for the pulsed data signal on the DC voltage level of electric/data line 104 to and from sprinkler head 102.

Thus when sprinkler head 102 is to turned on, controller 100 encodes data on electric/data line 104 with the sprinkler head number which is then received by all sprinkler heads 102 and only acted on by the sprinkler head identified in the message which is provided to local microprocessor 184 via data bus 186. Once activated, the angular position of nozzle 150 is reset using Hall sensor 158 in conjunction with magnet 160 as discussed above in relation to FIG. 7. Then, local microprocessor 184, using the data in RAM 188 and firmware in ROM 190, provides flow rate and rotational angle information which is applied to stepper motor controller 196 to activate and control the operation of flow rate stepper motor 128 and rotation stepper motor 148 to apply water through nozzle 150 to the programmed area. Each individual sprinkler head 102 has at least one particular water coverage pattern or individual plant that has been programmed into RAM 188 by the user to be used when activated. To maintain the desired coverage pattern from the sprinkler head, a flow rate Hall sensor 138 operating in conjunction with magnet 136 (FIG. 7) provides feedback to stepper motor controller 196 throughout the operation of the actual flow rate of water through the sprinkler head corresponding to the flow rate valve setting of nozzle 150.

Also, a direct connection from local microprocessor 184 is provided to jack 156 (e.g., phono jack) to provide external access for programing or reprogramming sprinkler head 102 when it is first installed in the system or when the coverage pattern is being changed, perhaps as a result of changing the plantings to be served by the particular sprinkler head. Jack 156 is provided so that the optional remote programing unit 110 can be used directly at the sprinkler head for programing purposes, rather than performing programming from controller 100 which may be some distance from the individual sprinkler head 102 that is being programed.

Sprinkler head 102 must be first connected to electric/data line 104 before it can be programed by either controller 100 or remote programming unit 110 so that power internal to sprinkler head 102 is present. Remote programming unit 110 includes a microprocessor 214 coupled via data bus 216 to RAM 218, ROM 220, display 222 and keyboard 224. When remote programming unit 110 is used, a remote/data line 109 provides a direct connection via jack 156 between microprocessor 214 in remote programming unit 100 and local microprocessor 184 in the sprinkler head that is being programed. During programing, display 222 and keyboard 224 of remote programming unit 110 are used in the same way as the corresponding components in controller 100 would be used if programing were performed using controller 100.

The second optional unit for the system of the present invention is weather station 108. Weather station 108 contains a microprocessor 198 and corresponding crystal oscillator couple via data bus 199 to RAM 200, ROM 202, data encoder/decoder 204, temperature sensor 208, humidity sensor 210 and wind sensor 212. Similar to sprinkler head 102, weather station 108 also contains a dual function power supply 206 that functions in the same way. In addition, weather station 108 is coupled to electric/data line 104 to transfer the detected weather condition information to controller 100 to be used to alter the timing and actual operation of the various sprinkler heads. For example, controller 100 may contain a subroutine to vary the flow rate and rotational angle of a sprinkler head given certain wind conditions. The weather information might also be used to modify the frequency and duration of activation of each sprinkler head based on various combinations of the weather information. For example, low temperature and high humidity with low, or no, wind could be used as an indicator of potential frost conditions, and knowing that a particular plant served by a particular sprinkler head is subject to frost damage, controller 100 could activate that particular sprinkler head at a time other than the usual time programed into the system for that sprinkler head. Other types of weather conditions could also be detected with controller 100 similarly modifying the operation schedule of some or all of the sprinkler heads.

FIG. 9 is a block diagram of a second embodiment of the internal block diagrams for each of the various components of the present invention and the interconnections between those components, including the optional weather station. In FIG. 9 each block that is the same as the blocks in FIG. 8 retains the same reference number to simplify the comparison and discussion of the two embodiments. By comparing FIGS. 8 and 9 it can be seen that the blocks of sprinkler head 102 and optional weather station 108, respectively, are identical, including the interconnections between them. The difference between the second embodiment and the first embodiment is basically the merging of the remoteness of remote programing unit 110 (FIG. 8) into detachable programing module 110' as part of controller 100'. Referring to FIG. 8, it can be seen that there is shown a display and a keyboard in each of controller 100 and remote programing unit 110. By eliminating display 176 and keyboard 178 from controller 100 (see FIG. 8) creates power hub 115 of controller 100' which alone controls the operation of the sprinkler system. By interfacing secondary data line 109' (in FIG. 8 it is remote data line 109) directly between secondary microprocessor 214 of programing module 110' with primary microprocessor 170 of power hub 115, the addition of programing module 110' provides the user interface to controller 100' which power hub does not independently include. With power hub 115 and programing module 110' interconnected, a keyboard 224 and display 222 are provided at controller 100' so that the user can program individual sprinkler heads from controller 100', as well as permitting the user to interface with controller 100' during normal standby and operation of the sprinkler system.

So that the second embodiment can also perform remote programing of the sprinkler heads, programing module 110' is detachable from power hub 115 by unplugging secondary data line 109' from power hub 115. Then at the location of the sprinkler head 102 to be programed, or reprogramed, secondary data line 109' is plugged into jack 156 of that sprinkler head which is tied directly to local microprocessor 184. In this configuration, programing module 110' is powered via secondary data line 109' either from primary microprocessor 170 in power hub 115, or local microprocessor 184 in sprinkler head 102 (as is remote programing unit 110 in the first embodiment of FIG. 8). Thus the actual operation of the second embodiment of FIG. 9 functions the same as described above with respect to the first embodiment in FIG. 8.

In actual operation, a connector is provided between programing module 110' and power hub to make the necessary electrical connection of secondary data line 109' to power hub 115, as well as to provide a mechanical fastener to retain programing module 110' in place. This mechanical retaining feature offers an advantage over the first embodiment since it will reduce the possibility of misplacing programing module 110', unlike remote programing unit 110 which could be left anywhere when not in use with a good chance that the location will be forgotten.

Figure 10:
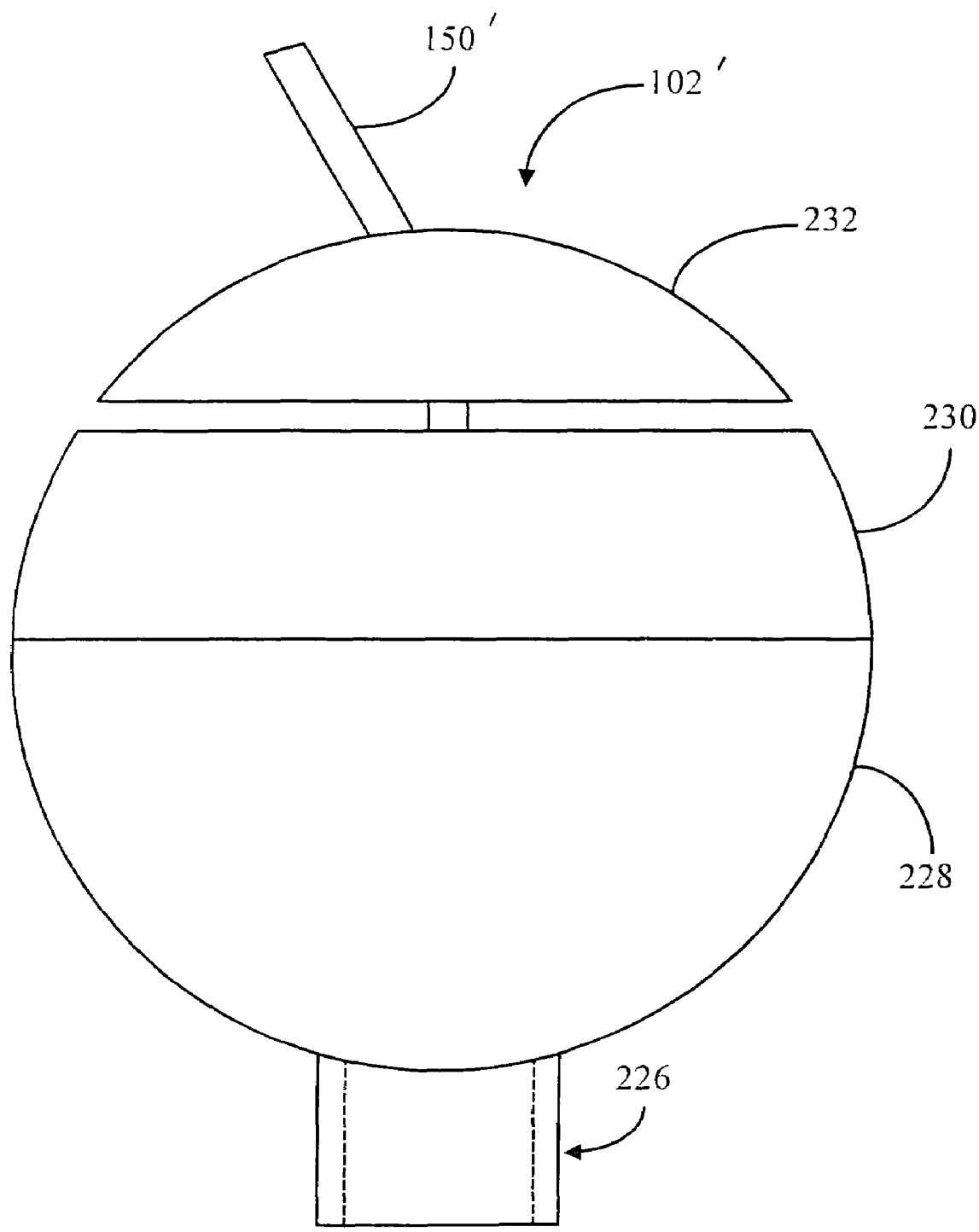
FIG. 10 is a side plan view of a second embodiment sprinkler head of the present invention.
Figure 11:
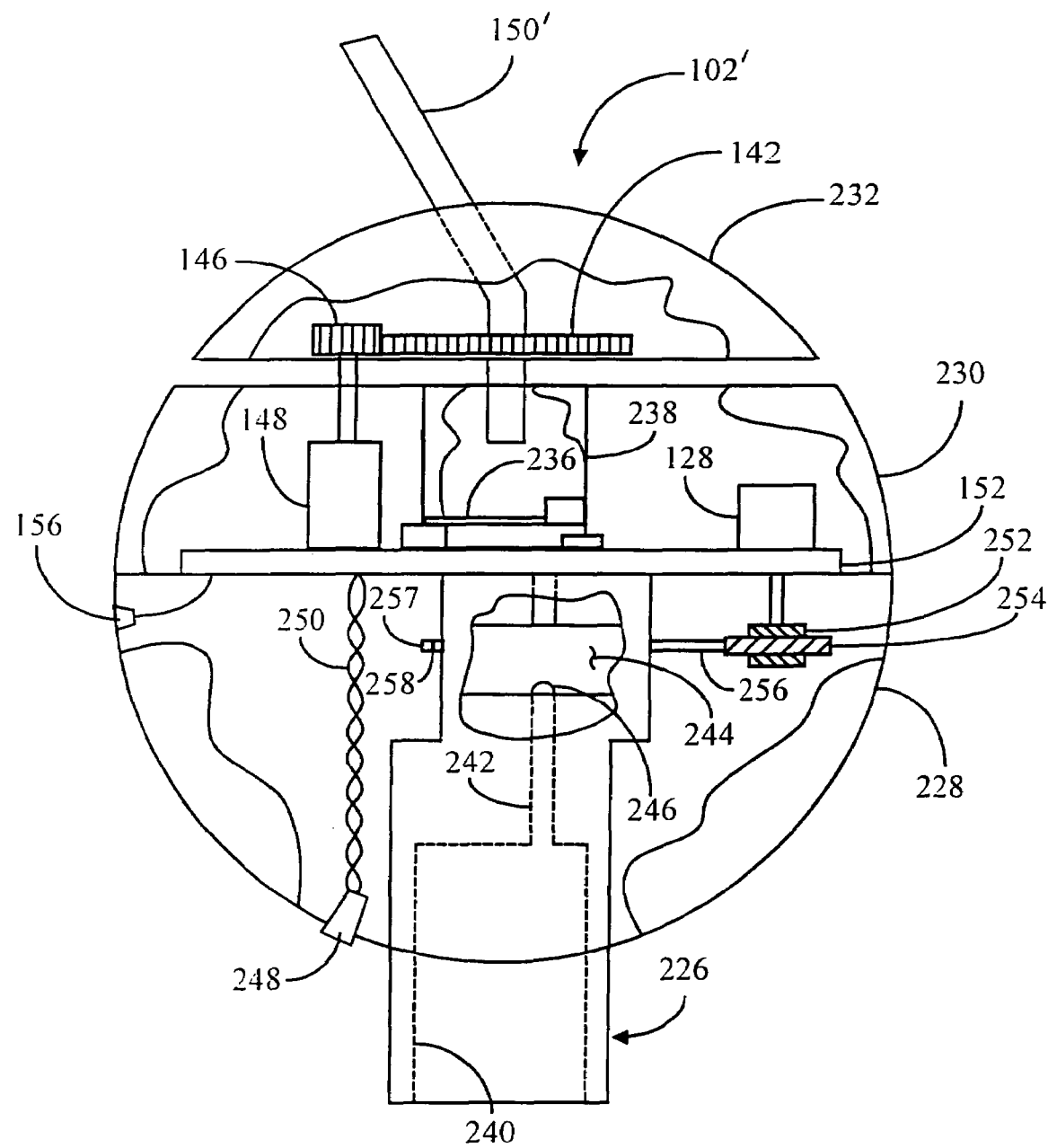
FIG. 11 is a partially cut-away side plan view of the sprinkler head of the present invention to show some of the internal parts thereof.
Figure 12:
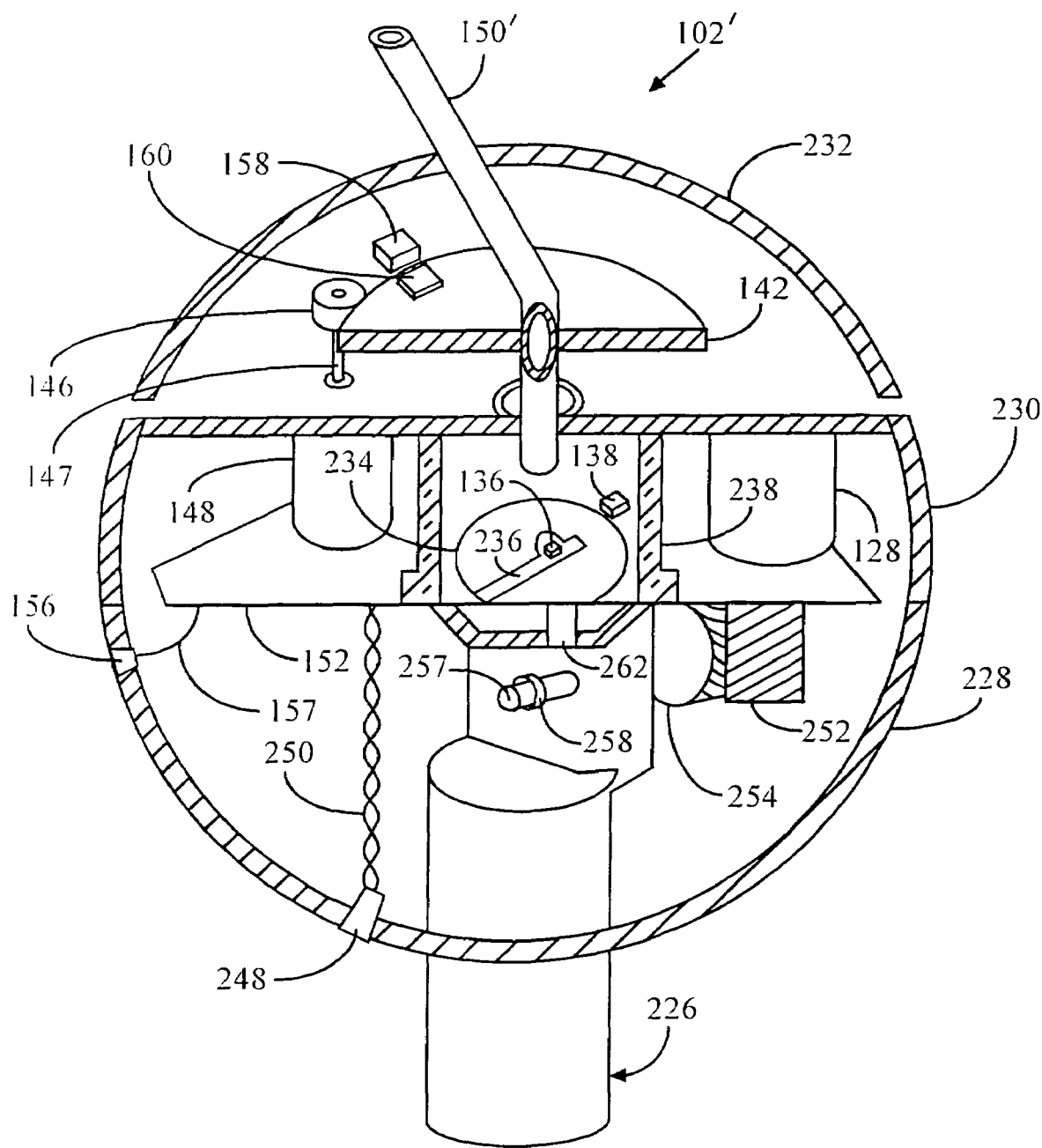
FIG. 12 is a cross-sectional view of the second embodiment sprinkler head of the present invention with the cross-section having been taken at about 30° to vertical.

The present invention also includes a second embodiment sprinkler head 102' as shown in FIGS. 10-12. FIG. 10 a side plan view of the second embodiment sprinkler head 102' illustrating the five externally visible components: the lower extension of valve body 226; lower hemisphere 228; printed circuit (pc) board/control component housing 230; top dome 232; and nozzle tube 150'. As can be seen in this view, top dome 232 is spaced apart from the top surface of pc board/control component housing 230 so that dome 232 is free to rotate relative to housing 230, together with nozzle 150', which will become clear from FIGS. 11 and 12.

FIG. 11 is a partial cut-away view of sprinkler head 102' of FIG. 10 with portions of valve shell 226, lower hemisphere 228, pc board/control component housing 230, top dome 232 and seal cap 238 cut-away to permit partial viewing of internal components. FIG. 12, similarly, is a cross-sectional view of the second embodiment sprinkler head 102' with the cross-section having been taken at about 30° to vertical and from the opposite side from that shown in FIG. 11.

Figure 13:
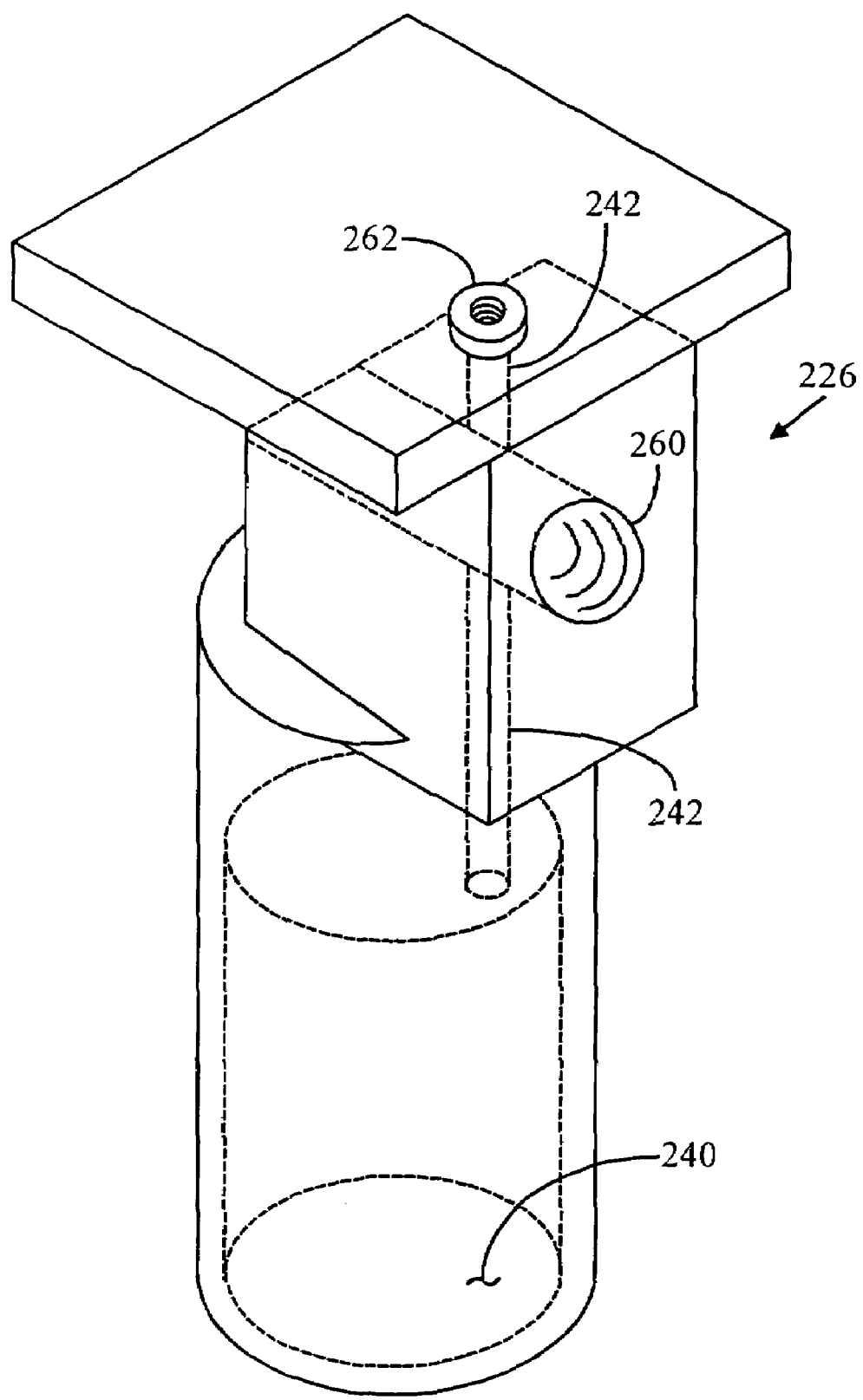
FIG. 13 is a perspective view of the valve body of the second embodiment of the sprinkler head of the present invention.

From FIGS. 11, 12 and 13, valve shell 226 can be seen to have an internal cavity 240 in the portion that extends outward from lower hemisphere 228 with internal cavity 240 having an internal diameter that is substantially the same as the outer diameter of a PVC plastic riser tube that sprinkler head 102' is to be mounted on. By making valve shell 226 also from PVC plastic, sprinkler head 102' can be glued to the PVC riser to minimize the possibility of vandalism, either by taking the sprinkler head 102', or by rotating sprinkler head 102' so that other than the programed area is watered when sprinkler head 102' is activated. Extending upward within valve shell 226, internal cavity 240 bottoms out to limit the distance that the PVC riser can extend therewithin. Opening into the internal end of cavity 240, and extending upward through valve shell 226, is water channel 242 that has an internal diameter that is much smaller than that of cavity 240. Water channel 242 also extends downward from channel outlet 262 in the top of valve shell 226 with both portions of water channel 242 aligned with each other on opposite sides of valve passage 260 with the longitudinal center line of valve passage 260 oriented perpendicularly to the longitudinal axis of valve shell 226.

Figure 14:
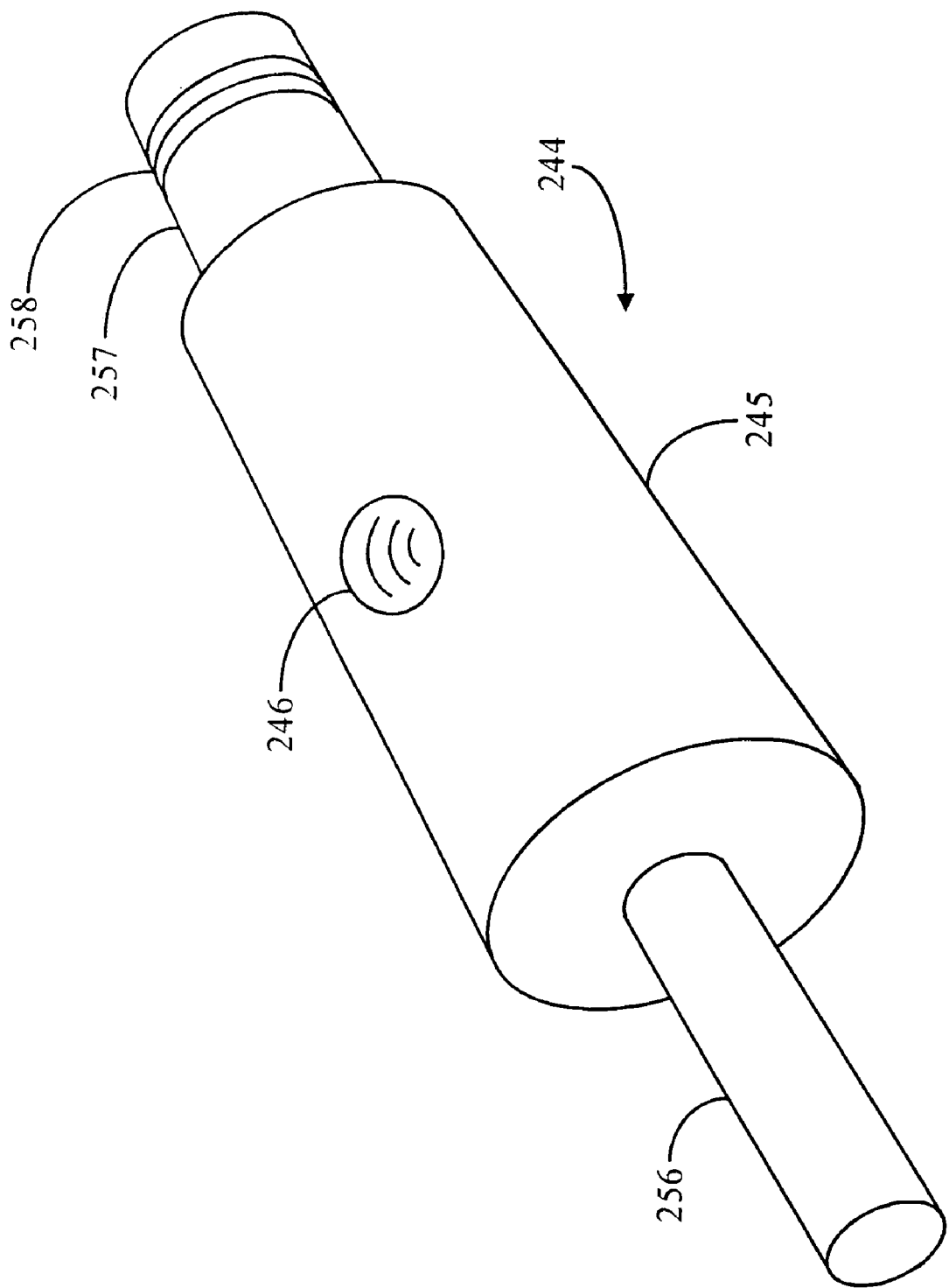
FIG. 14 is a perspective view of the valve of the second embodiment sprinkler head of the present invention.

Additionally, FIG. 14 shows valve body 244, having a circular cross-section along the entire length taken perpendicularly to the longitudinal axis thereof and having three sections: main body 245; valve stem 256; and retainer stem 257 having a smaller diameter than main body 245. Valve body 244 fits within valve passage 260 of valve shell 226 (see FIGS. 11-13) with the retainer stem 257 end inserted first with water passage 260 in main body 245 alignable, perpendicular to, or partially or completely aligned with, both portions of water channel 242 to control the water flow rate through valve shell 226 and eventually out from nozzle 150' as valve stem 256 is rotated as discussed below. To keep valve body 244 in position, a retainer ring, or "O" ring, is placed in groove 258 in retainer stem 257.

Figure 15:
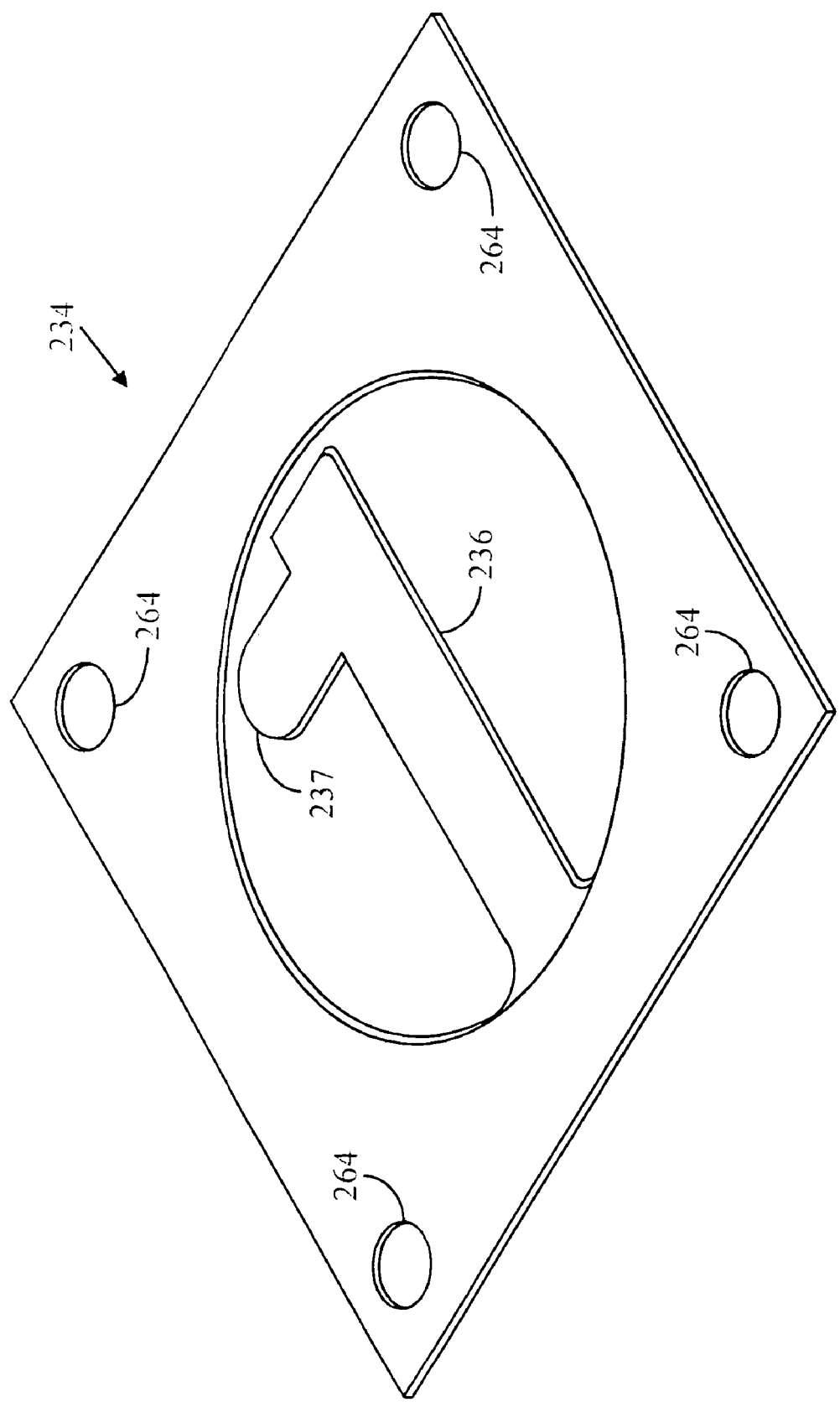
FIG. 15 is a perspective view of the meter plate of the second embodiment sprinkler head of the present invention.

Above the top of valve shell 226 is a central hole through printed circuit board 152. Mounted above that hole is flow meter plate 234 (see FIG. 15) which has a central hole of substantially the same dimension as the hole in printed circuit board 152. Flow meter plate 234 is shown here secured to printed circuit board 152 by means of holes 264. Attached to the inner edge of, and extending substantially across the center of, the hole in flow meter plate 234 is meter finger 236 with tab 237 extending to the side of flow meter finger 236 near the free end. When mounted in place on printed circuit board 152, tab 237 of flow meter finger 236 is directly above channel outlet 262 of valve shell 226 when no water is flowing (see FIGS. 11 and 12). Printed circuit board 152 is sandwiched between flow meter plate 234 and the top of valve shell 226 with the fastening devices used passing through holes 264 and printed circuit board 152 with the distal end of each fastener secured to the top of valve shell 226. Mounted on tab 237 is permanent magnet 136, which in conjunction with flow rate Hall sensor 138 mounted adjacent thereto outside the central hole in flow meter plate 234, provides a measure of the water flow rate past flow meter finger 236 and tab 237 which function in the same way described above in the first embodiment sprinkler head. Note, while the holes shown in FIGS. 12 and 15 are round, they may be of any shape.

To prevent water coming into contact with the conductive traces and electronic components on printed circuit board 152, seal cap 238 surrounds flow meter plate 234 and extends from printed circuit board to the inside of the top surface of pc board/control component housing 230 and seals with both surfaces. The conductive traces and the electronic components shown in the sprinkler head 102 electronics block in FIGS. 8 and 9 are located on pc board 152 outside seal cap 238. For simplicity, the only electronics shown mounted on pc board 152 are flow stepper motor 128 and rotation stepper motor 148. In addition, internal electric/data line 250 runs between pc board 152, through lower hemisphere 228, and electric/data line connector 248 into which electric/data line 104 connects (see FIGS. 8 and 9); and a line extends from local microprocessor 184 (see FIGS. 8 and 9) on pc board 152 to remote control connector 156 also in lower hemisphere 228.

To control the position of water passage 246 in valve body 244, relative to water channel 242 through valve shell 226, flow stepper motor 128 is provided under control of local microprocessor 184 and feedback from flow rate Hall sensor 138 as discussed above relative to the first embodiment sprinkler head. The shaft of flow stepper motor 138 extends downward through pc board 152 with flow stepper motor helical gear 252 mounted on the shaft. Similarly, valve stem helical gear 254 is mounted on valve stem 256 with gears 252 and 254 meshed with each other to cause the selected rotation of valve body 244 within valve shell 226.

Extending downward through a water tight seal in the center of the top of pc board/control component housing 230 is the lower end of nozzle tube 150' which is secured in place with a rotatable fitting (not shown) within housing 230. Above housing 230, nozzle gear 142 is secured around nozzle tube 150' with permanent magnet 160 mounted in one position near the edge. Mounted in a fixed position on the top of housing 230, a fixed distance from the furthest extent of gear 142, is rotation/position Hall sensor 158. Additionally, shaft 147 of rotation stepper motor 148 extends upward through the top of housing 230 with drive gear 146 mounted on shaft 147 and positioned to mesh with gear 142 to turn nozzle 150' to direct angular placement of the water exiting nozzle 150'. Finally, top dome 232 is secured to nozzle 150' spaced apart from the outer edge of the top of housing 230 to prevent foreign matter from being captured by gears 142 and 146 and to protect Hall sensor 158 and magnet 160.

Figure 16:
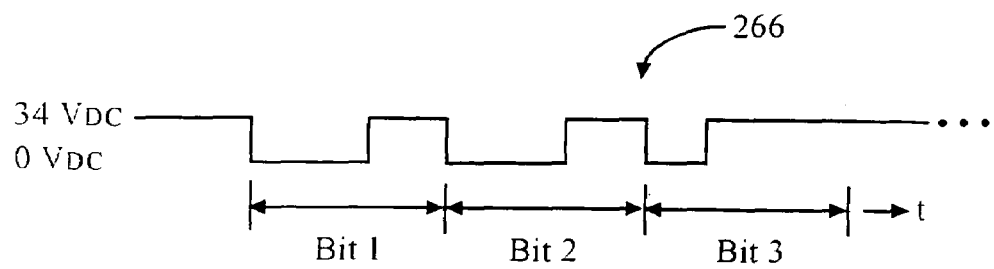
FIG. 16 is a graphical representation of bi-phase data modulation of power line.
Figure 17:
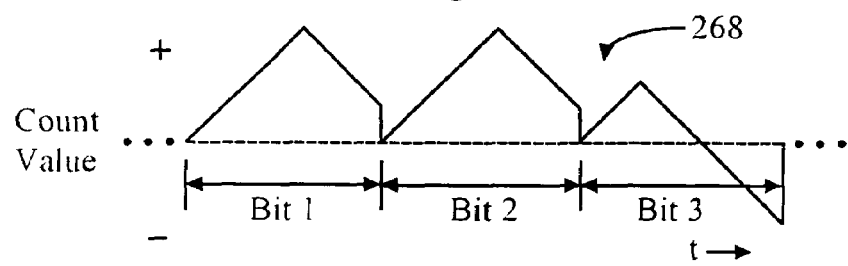
FIG. 17 is a graphical representation of a counter technique for determining whether an encoded bit is a "0" or a "1"

Any power line modulation scheme can be used with the present invention. One such scheme, generally known as bi-phase, is illustrated in FIGS. 16 and 17 with the signal going in either direction, and that direction can not be determined by merely looking at the signal, on electric/data line 104. In such a communication technique, the unit sending the signal waits a predetermined length of time after sending a signal to listen for a response from the unit being communicated with. Viewing FIG. 16 a modulated portion of the electric/data signal 266 is illustrated. Here the power line is modulated by turning the power on line 104 on and off. In this illustration there are three bit times illustrated. Each of bits 1 and 2 shows the power being off for two-thirds, and on for one third, of the time to represent a logical "1". Bit 3 on the other hand shows the power being turned off for one third, and on for two-thirds, of the time to represent a logical "0". Data modulation of this type on the power line is a self clocking scheme by virtue of the modulation timing technique described. In the classical form, and as illustrated in FIG. 16, one bit time occurs between falling edges of the signal.

There are several different ways to decode a data signal modulated on a power line. One way is to use the falling edge into a one-shot so that edge can clock off of the same signal and get a 1 or a 0. A more reliable method to decode the data from the power line is to use a counter (e.g., an internal function of a microprocessor) to count up during the time when the modulated power signal is low and down when that signal is high at the same rate in both directions. Thus, since in this illustration power is applied for at least the last third of each bit and the 0 vDC period is always at the beginning of a bit, the resulting count at the end of the bit time when a "1" is being transmitted will always be a positive value, whereas the resulting count at the end of the bit time when a "0" is being transmitted will always be a negative value.

That technique is illustrated FIG. 17 with the count value trace 268 versus time for the signal in FIG. 16. Thus, for Bit 1, the counter counts up for two thirds of the bit time and down at the same rate for one third of the bit time resulting a positive value at the end of Bit 1. Also at the end of Bit 1 the count is reset to 0 and begun again for Bit 2 with the same result since a "1" is also being transmitted in Bit 2. Again at the end of Bit 2 the count is reset to 0 and begun again for Bit 3. Since a "0" is being transmitted in Bit 3, the count is up for the first third of the bit time and down for two-thirds of the bit time resulting in a negative final count for Bit 3.

Using a modulation scheme such as the one described above, a bit length of 3 ms might be used. Since the power is pulsed only when a message is being sent, the resulting duty cycle is in the range of 20%. Thus, with this modulation scheme power is also being applied both when a message is sent, as well as when one isn't.

Figure 18:
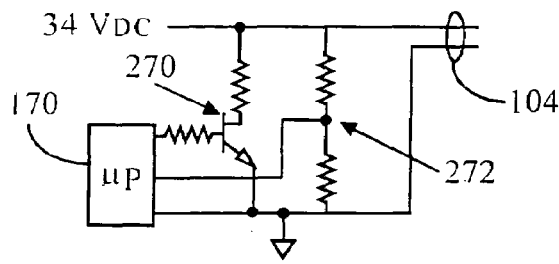
FIG. 18 is a simplified schematic diagram of the power hub power line modulation/demodulation circuit.
Figure 19:
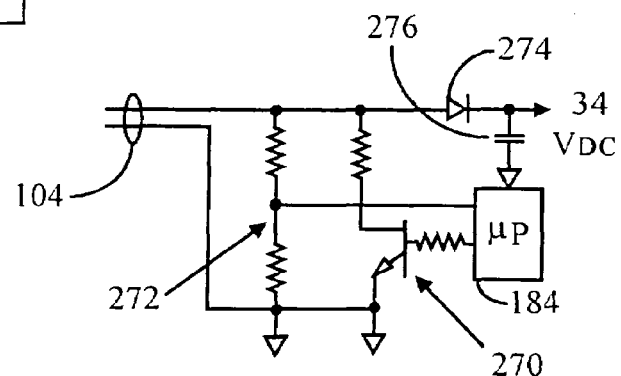
FIG. 19 is a simplified schematic diagram of the sprinkler head power line modulation/demodulation circuit.

The implementation of such a communications technique in power hub 115 and sprinkler head 102/102' is illustrated in FIGS. 18 and 19, respectively. FIG. 18 shows primary microprocessor 170 at power hub 115 (FIG. 9) or controller 100 (FIG. 8) shows transistor 270 with the base connected to an output terminal of microprocessor 170, the emitter connected to ground and the collector connected to the 34 vDC supply line. In this configuration, to modulate electric/data line 104, microprocessor 170 turns transistor 270 on to selectively pull the power line to ground. Additionally, there is a voltage divider 272 connected between the two wires of electric/data line 104 with the intermediate point connected to an input terminal of microprocessor 170. Microprocessor 170 thus monitors the intermediate point of voltage divider 272 to determine if there is data on electric/data line 104 from one of the sprinkler heads 102/102' or weather station 108, and if there is, to count the length of time that voltage level is low to determine whether the bit is "0" or "1", as discussed above.

FIG. 19 is a simplified electric/data line interface circuit of local microprocessor 184 in a sprinkler head 102/102'. Included here are transistors 270 and voltage divider 272 which functions in the same way as discussed above for FIG. 18 in power hub 115 or controller 100. In addition, since the sprinkler head is powered from the power hub 115 or controller 100, a diode 274 in series with the power line followed by a capacitor to ground is used to rectify the signal on electric/data line 104.

Figure 20:
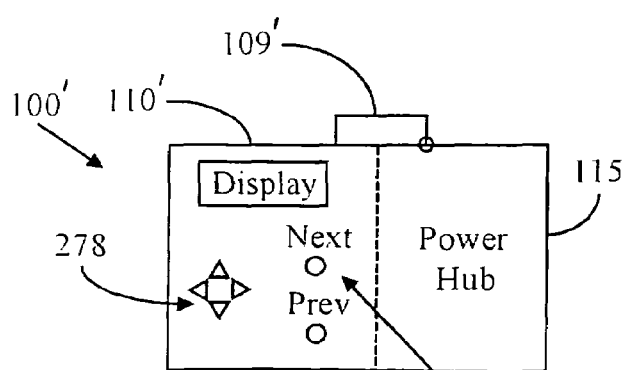
FIG. 20 is a simplified representation of the second embodiment controller 100', and the continuant parts—power hub and programing unit—joined together.

FIG. 20 illustrates the mechanical relationship of the combination of power hub 115 and programing unit 110' when interconnected to form controller 100'. Programing unit 110' is physically mounted beside power hub 115 with direct communication being provided between secondary microprocessor 214 of programing unit 110' and microprocessor 170 of power hub 115 provided by line 109' that is plugged into a connector on power hub 115 (see FIG. 9). When in use at a remote sprinkler head 102, line 109' is disconnected from power hub 115, programing unit physically moved to a sprinkler head of interest where line 109' is plugged jack 156 to make a direct connection with local microprocessor 184.

In addition, FIG. 20 illustrates one possible configuration of the keyboard and display of programing unit 110' (FIG. 9), or remote programing unit 110 and controller 100 (FIG. 8). For user entry of data, four arrow keys (up, down, left, right) 278, and "NEXT" and "PREVIOUS" keys 279 are provided. The use of these keys is illustrated below in the discussion of the programing of a sprinkler head.

Before discussing the details of the programing of the present invention, some understanding of efficient watering, or irrigation, theory is needed. A recent book that covers much of the current thinking on efficient irrigation is *Landscape Irrigation Design and Management* by Stephen W. Smith, John Wiley & Sons, 1997.

Initially, when the average home owner thinks about programing a sprinkler system they guess that they want to water a particular location for ten minutes, three times a week, and another for five minutes six times a week, and so on. That is exactly how most of the prior art commercially available sprinkler system timers are designed to be programed. However when one thinks seriously about what is necessary to properly irrigate even one's yard, one soon realizes that it is not that simple. Depending on the size of the various patterns that one is going to water, it soon becomes apparent that ten minutes for one pattern delivers a different amount of water than for another pattern. Depending on the pattern size, a different amount of water, or 'rainfall', in terms of inches of rainfall, will vary both with the size of the pattern and the amount of time that water is applied. The next thing that comes to mind is that some plants need more water than others, and if your landscape plantings include a variety of plants with a variety of water requirements in the same pattern that is being watered, some plants will likely be over watered, and others under watered. In reality, given the guesses that one uses to program the existing timers, or for manual watering, it is more likely that all of the plants will be dramatically over watered.

The next thing that will become apparent is that the cost of the irrigation system is soon dwarfed by cost of water which continues to become more expensive each year. This is true for the homeowner, and even more so for big water users such as farmers, golf courses and cities for public parks.

Professionals, when they design and install a sprinkler system, put the conventional sprinkler heads close together to get an overlap of the watering pattern of those heads. That is necessary to get even coverage of the area being watered, but even doing that, the actual coverage can vary 50% across the watered area. Thus, if the variation is 50%, then double the amount of water needs to be applied so that the spots that get the least amount of water get a sufficient amount of water to prevent dead spots from occurring in the lawn. Therefore twice the amount of water will be needed just to keep marginal spots green. Evenness translates directly to dollars.

There is another aspect to this, and that is how to water most efficiently. There are numerous theories as to how that can be done with the most popular theory being the "checkbook" method. To best understand the checkbook method it is necessary to provide some background information.

If a piece of lawn is cut from the pattern to be watered, placed in an open top box, then saturated with water and monitored to determine how long it takes water to be lost from the box, the evapotransporation rate of the grass can be determined. Evapotransporation rate is the net loss of water from the soil plus the plant. It is easy to get that number for grass but not so for peach trees. If the evapotransporation rate is known for a particular plant, or crop, how water will be depleted will be known. For maximum efficiency it is necessary to know a lot of things about the irrigation setup, including the evapotransporation rate for the day. When the evapotransporation rate for a range of soil types is reviewed it is apparent that the rate varies by a factor on the order of 2:1. Soil, the water holding power of soil and the level where the water becomes depleted so that the plants can not get water, also does not vary that much.

For the present invention the various aspects of irrigation theory were taken into account to develop a routine that is simpler to use than the text book method in making the determination of the amount of water needed, while retaining a substantial degree of accuracy. From that review it was determined that the real key to accurate watering is knowledge of the stress tolerance of each plant in the planted area. Stress tolerance for a particular plant is defined as the number of inches of water that can evaporate before the plant starts realizing stress due to lack of water. That is the basis of the "checkbook method". For example, assume that the plant of interest has an actual stress tolerance of 5 inches of rainfall and each day the local evapotransporation rate is 0.1 inch of rainfall, each day that plant does not receive any water the effective stress level is reduced by the evapotransporation rate. Thus, in this example the next day the remaining effective stress level, or "checkbook" balance, for the plant is 4.9 inches, and at this rate it will be 50 days before the "checkbook" balance reaches zero and that plant will have to be watered.

Knowing the stress tolerance of each plant, it is then necessary to know is how many inches of rainfall, or dose, need to be provided when the effective stress level of the plant reaches zero. For example, grass has shallow roots so the dose is relatively small with the stress point reached quickly. Thus, grass has a low stress point, it can not take much stress; cactus or an oak tree have very high stress points but require a different dose because it is a question of how deep does the water have to go.

When programing each sprinkler head of the present invention for each separate area to be watered by that sprinkler head, the stress tolerance and dose need to be entered for the type of plant in each of the corresponding areas. The other piece of information that the irrigation system needs is the standardized evapotransporation rate ($ET_0$) for the geographic location where the sprinkler system is installed with the standardized evapotransporation rate being used for all plants at the same location. Since the $ET_0$ data is available for various locations within a state from the State Department of Agriculture, or an equivalent agency, at least on a monthly basis, the historical month by month average can be preprogramed into the system controller, or power hub, for the area where the irrigation system is installed. The $ET_0$ for January may average 1.5 inches of water with the $ET_0$ increasing as summer approaches and then going back down through the fall into December and the winter months. An option would be to connect the controller, via telephone or the Internet, to the state agency that determines the $ET_0$ information to receive the $ET_0$ for the current month in the local area if the current $ET_0$ is critical to the plants to be watered by the irrigation system. In California the $ET_0$ information is available from CIMIS (California Irrigation Management Information Service) as determined by the California Department of Agriculture.

While the above discussion relative to FIG. 6 illustrated the use of a sprinkler head of the present invention to water a single area, it is clear that a single sprinkler head can be programed to water non-overlapping areas, with the plants in each area having different stress and dosage levels from those in each other area.

Thus there are three values that are needed for each area to be watered: the historic $ET_0$ pattern which is indigenous to the area where the sprinkler system is installed; stress tolerance of plants in a selected watering area; and dose level for the plants in each area. Since standardized $ET_0$ is used for all plant types in the local area, the necessary $ET_0$ information is programed into controller 100 or power hub 115 for use by all of the sprinkler heads in the system. However, the stress tolerance and dose level being different values for each planted area of interest (plant type) to be watered, that information is programed into each sprinkler head 102 when each area to be watered by that particular sprinkler head is established.

Figure 21A:
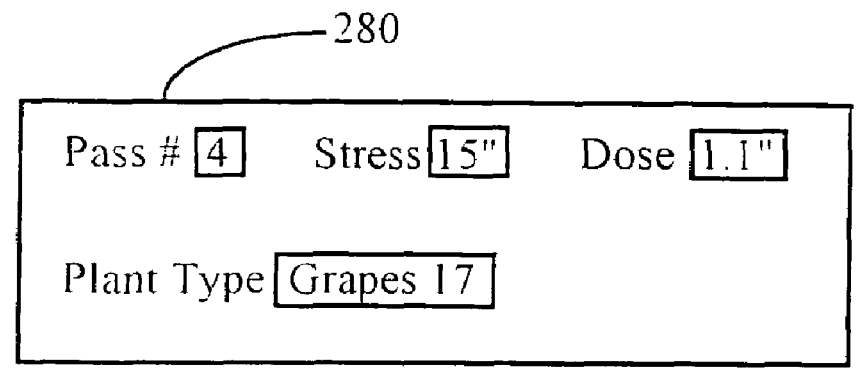
FIGS. 21a, 21b and 21c illustrate the screens of the programing unit when a sprinkler head is initially programed, or reprogrammed.
Figure 21B:
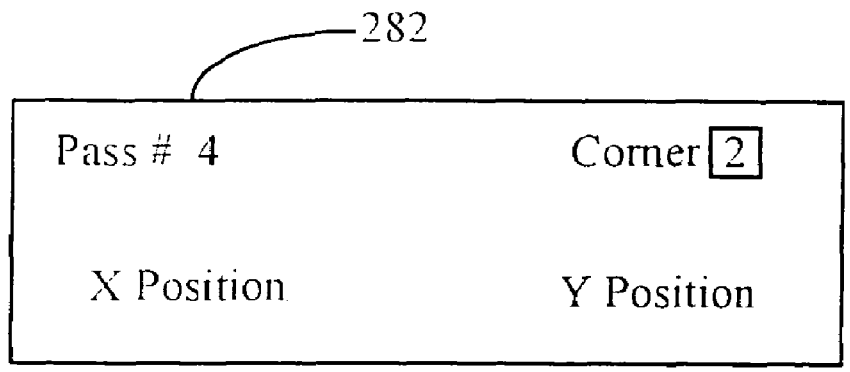
Figure 21C:
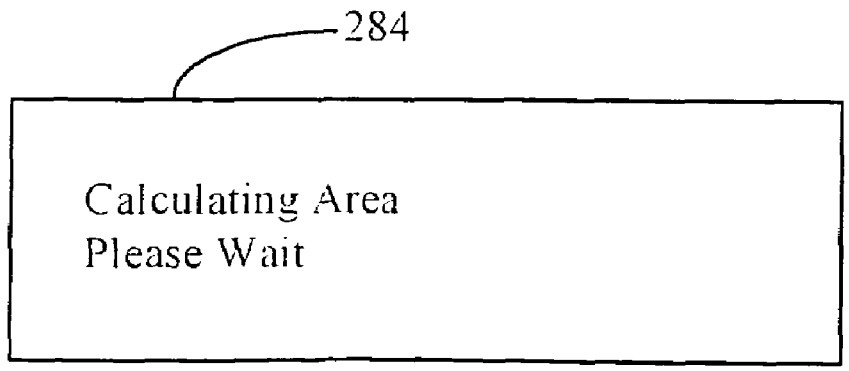
Figure 22A:
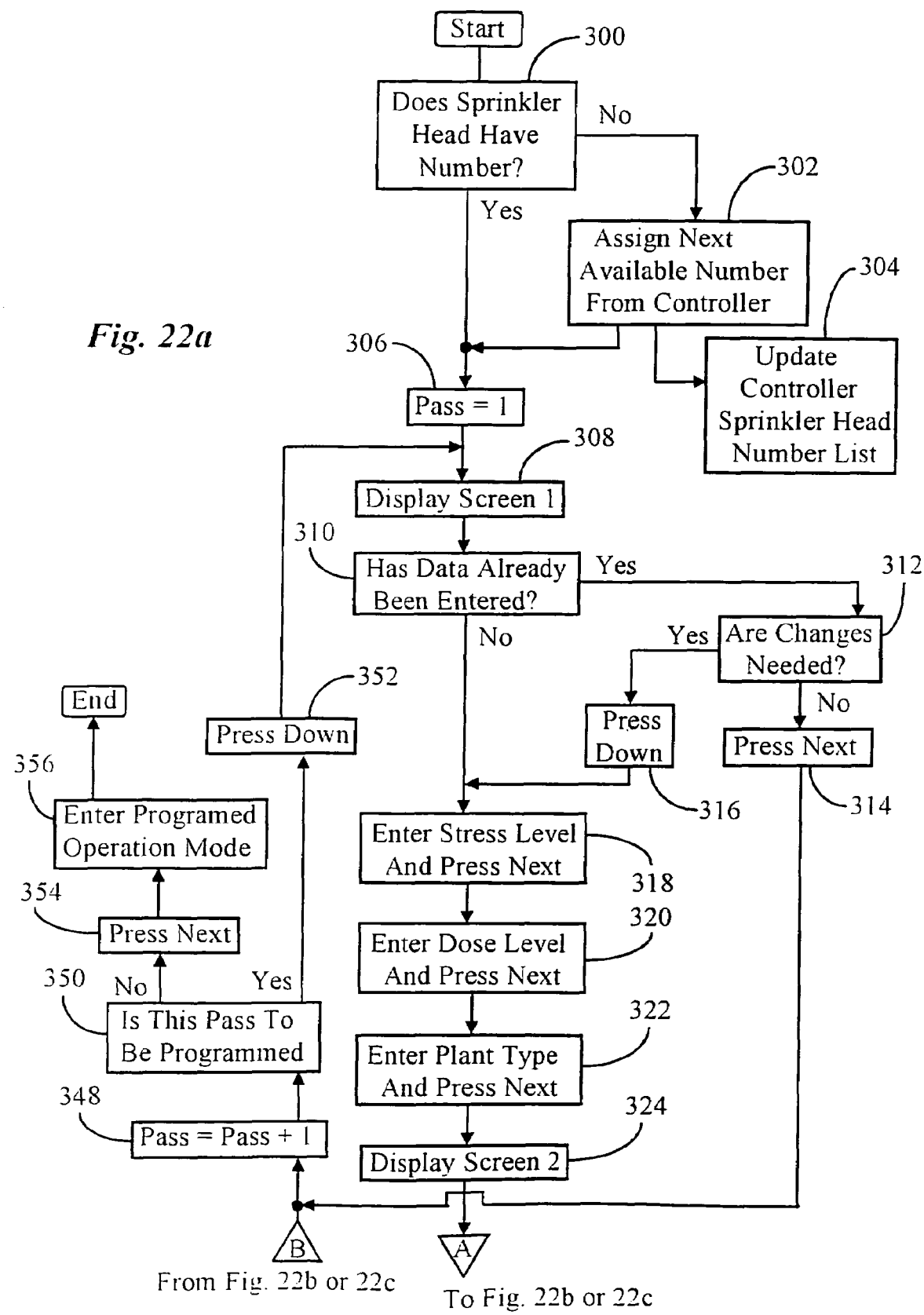
FIGS. 22a and 22b together, or 22a and 22c together, are alternative flow charts of the programming/reprogramming of a sprinkler head.
Figure 22B:
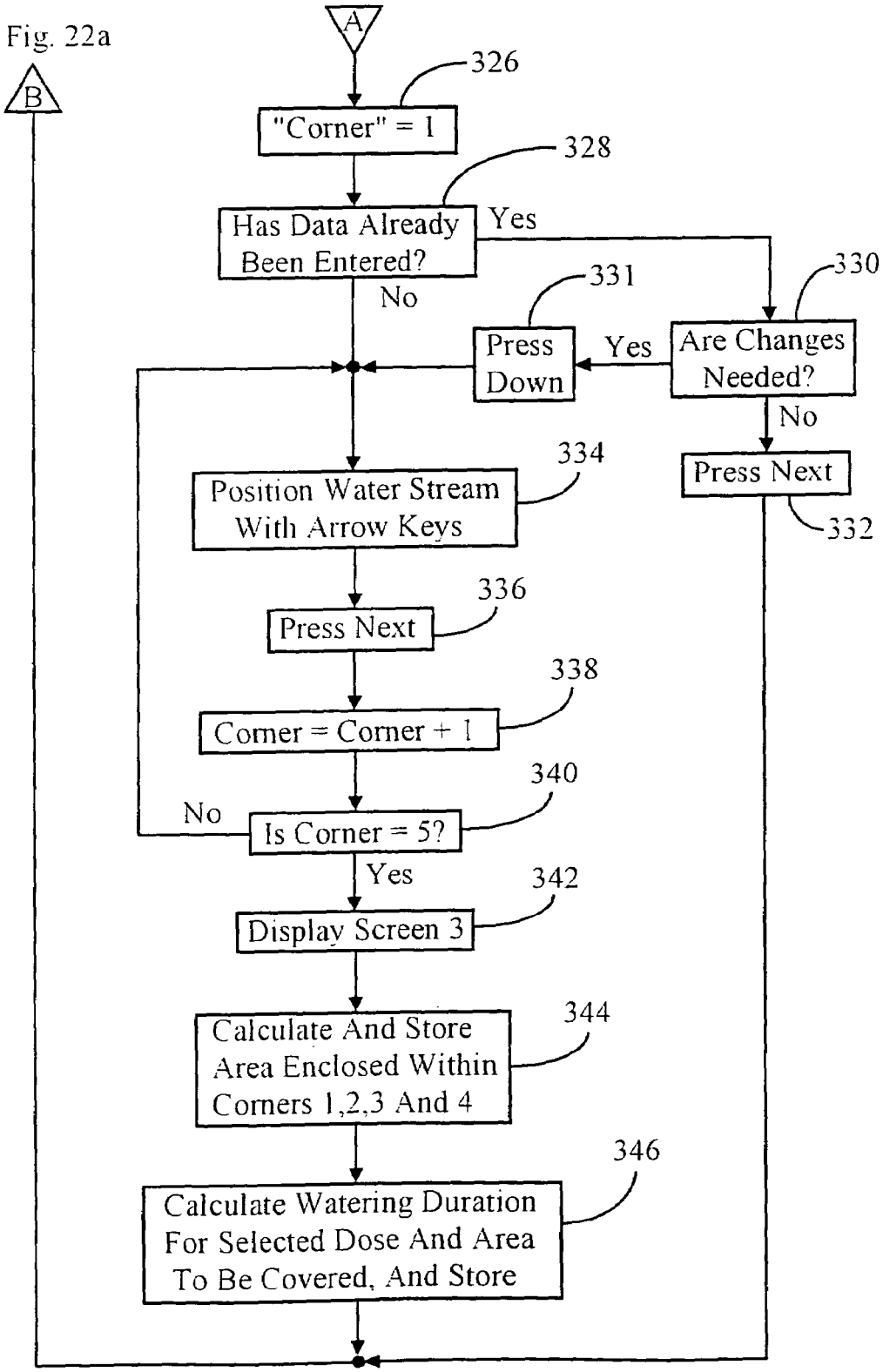
Figure 22C:
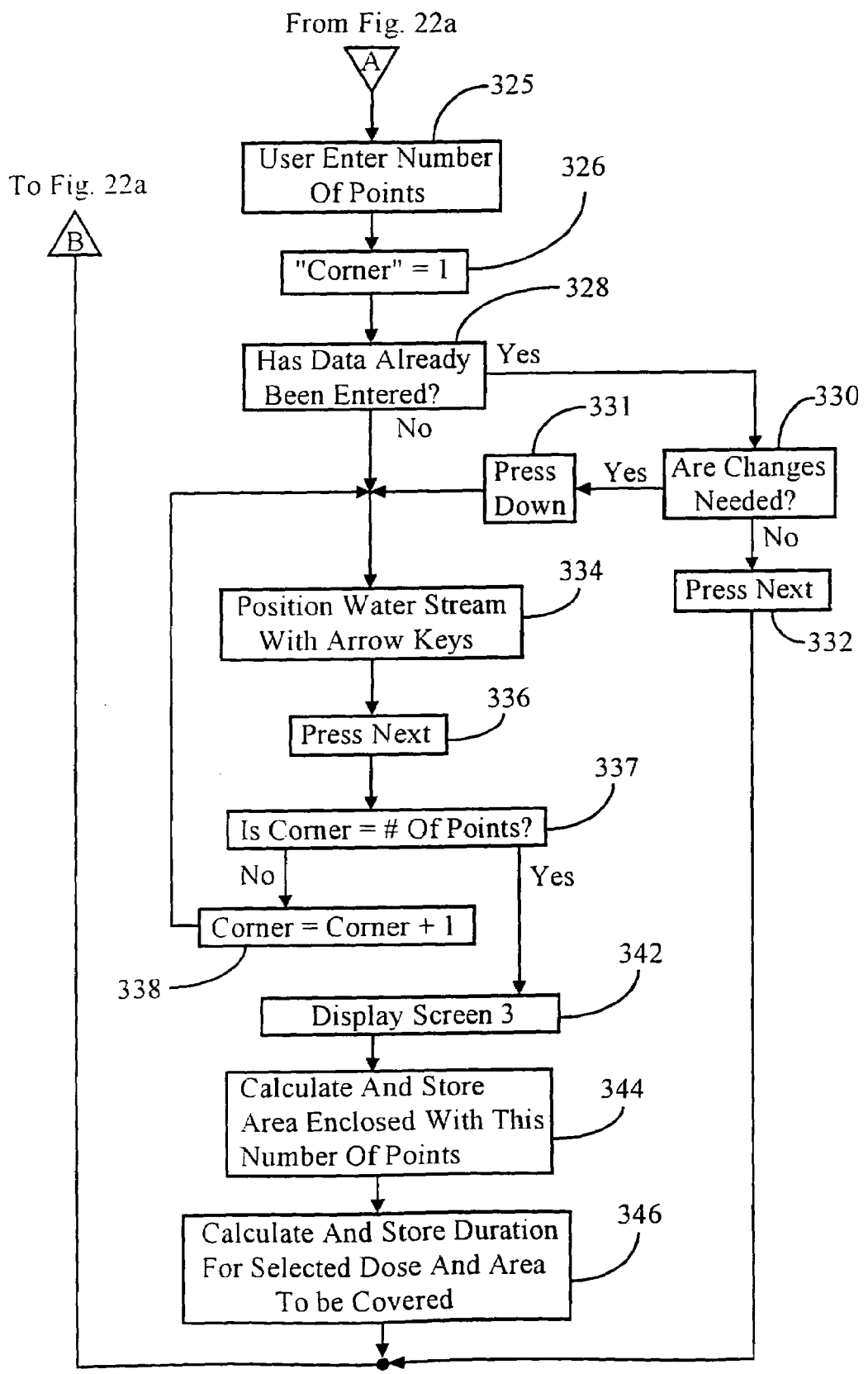

FIGS. 21a-c and 22a-c are provided to illustrate the programing of each sprinkler head individually. FIGS. 21a-c show representative screens on controller 100, remote programing unit 110, or detachable programing module 110', depending on which embodiment of the present invention is used and whether the programing is performed at the controller or at the individual sprinkler head 102. FIGS. 22a and 22b, and FIGS. 22a and 22c, provide alternative flow chart representations of the programing steps of the an individual sprinkler head 102. FIGS. 22a and 22b together illustrate programing of a sprinkler head wherein the number of corners of the planted area of interest is always defined by four points. (Note: Four points have been selected to illustrate the programing method with a preselected number of points, however that selection has been done only for illustrative purposes and any number of four or greater could have been selected as a fixed number example.) Whereas FIGS. 22*a* and 22*c* together illustrate programing of a sprinkler head wherein the user determines the number of points needed to identify the planted area of interest. As discussed above, if the programing is to be performed at the sprinkler head, then the programing unit is plugged into connector 156. The program to perform sprinkler head programing is resident in either controller 100 or the remote unit that is plugged into the sprinkler head.

In FIG. 22*a* at block 300 the sprinkler head is interrogated to determine if it is a new sprinkler head or one that was previously installed in the system and is being reprogrammed. If the sprinkler head had been programed previously, controller 100 would have assigned a number to it which is stored in RAM 188 of the sprinkler head. If a number had not been assigned, then the controller assigns a number (block 302) and updates the head number list within the RAM of the controller. If a number had been previously assigned, or after one has been assigned, control moves to block 306 where the value of variable "PASS" is set equal to "1". "PASS" is the term used here for each area to be watered by the current sprinkler head and, as will be seen, multiple loops will be made through the flow chart to program the sprinkler head for each pass (area) to be watered. At block 308 the controller causes a first screen to be displayed on the programing console of the unit being used for programming. In FIG. 21*a* an example first screen 280 is shown with a pass # 4 (area 4). That number is provided by the sprinkler head and corresponds to the area being programed currently. The pass number can not be changed directly by the user, only indirectly by programming an additional pass or by deleting one. The user would enter the stress, dose and plant type information.

If data had previously been entered for the current pass (block 310), flow moves to block 312 and the user has an opportunity to change that information by pressing a predetermined key on the programing unit keyboard. For purposes of illustration here it is shown (block 316) that the user would press the down arrow, otherwise the user presses the "NEXT" button (block 314) on the console to leave the programed variables as they were. If there was no data entered, or if the data is to be changed for the current pass, flow proceeds to block 318. If there was data that is not to be changed flow proceeds from block 314 to block 348 which will be discussed below.

Then at block 318 the user enters the stress tolerance for the plant in the corresponding pass, perhaps by pressing and holding the up arrow key to increase the number in tenths of an inch, or the down arrow in the same way to lower that number. Once the user has set the stress tolerance value, the "NEXT" key on the keyboard might be pressed to advance the operation to the entry of the dose level (block 320) which is accomplished in a manner similar to the entry of the stress value and then "NEXT" is pressed, advancing the operation to optional block 322 for the user to enter a plant type by using the arrow keys on the keyboard to select one from a preprogramed list, or to use the keys in a prescribed fashion to spell the type of plant. In a basic system, plant type could be eliminated with stress and dose alone being entered as the watering instructions, or in a more advanced system the entry of plant type could be used to check the stress and dose information to insure that correct values have been entered. In an even more advanced system, the user could merely be asked at screen 1 to enter the plant type and the system would internally provide the stress and dose information unless overridden by the user. Pressing "NEXT" in blocks 318, 320 and 322 enters that data into RAM 188 of the sprinkler head together with the current pass designation.

Thus, when block 322 is completed, the user again presses, for example, "NEXT" on the keyboard to advance to screen 2 (block 324 and FIG. 21*b*). Screen 2 is displayed and flow then continues from "A" of FIG. 22*a* to "A" of either FIG. 22*b* or FIG. 22*c* for the user to define the area to be watered by the sprinkler head in the current pass. At this point in the discussion flow continues in FIG. 22*b*. Note that at block 326 the variable "CORNER" is set equal to "1" by the system.

Before proceeding with the steps in this part of the programing of the sprinkler head, attention is directed to FIGS. 25*a-d* to better understand the definition of the area to be watered. To simplify the discussion of the present invention below, four points will be used to define each area that a particular sprinkler head is to water, however, the sprinkler heads could be programed to use any number of points including a variable number, i.e. one, two, three, four or more. In the variable option, as will be seen in FIG. 22*c* as discussed below, the user first informs the sprinkler head as to how many points will be used to define the area to be programed into the sprinkler head. In the simplified example that is discussed in FIG. 22*b* below, four points are used to program an area into the sprinkler head, whether the area consists of a single point, a line, a triangle or a polygon. Whichever approach is used depends only on the firmware included in each sprinkler head and does not otherwise impact the viability of the present invention.

Figure 25A:
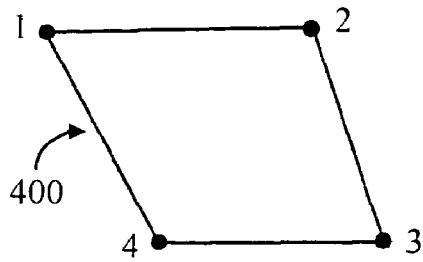
FIGS. 25a, 25b, 25c and 25d are illustrations of a four points example used to program a sprinkler head to cover a quadrilateral area, a triangular area, a straight line, and a single point, respectively.
Figure 25B:
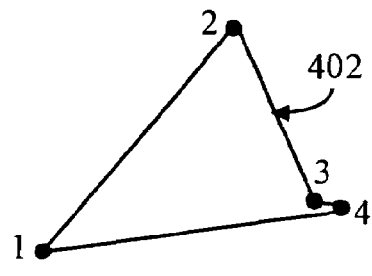
Figure 25C:
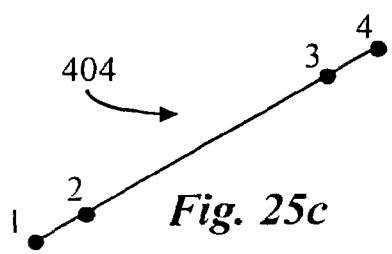
Figure 25D:
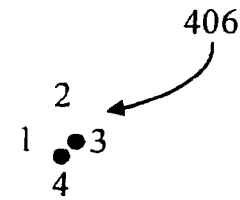

In the four point example, to program an area into the sprinkler head, the user might place targets at four points that define the area, and with a water stream flowing from the sprinkler head adjust that flow to hit each target in turn. FIG. 25*a* illustrates a quadrilateral area 400 defined by points 1, 2, 3 and 4. In FIG. 25*b* there is a triangular area 402 defined also by four points 1, 2, 3 and 4 with points 3 and 4 located at the same corner of area 402. FIG. 25*c* illustrates a straight line area 404 again with four points 1, 2, 3 and 4. In the straight line case one point needs to be located at each end of the line segment with the other two points located at any point along the length of the line segment. In FIG. 25*c* points 1 and 2 are located at one end of the line segment 404, while points 3 and 4 are located at the other end. Additionally, an area to be watered could be a single point as in FIG. 25*d* with all four points located adjacent to each other. In a more advanced system the user could be asked the type of pattern desired and the system would therefore know how many points need to be programed.

Returning to FIG. 22*b* following block 326, the next thing that is determined is whether or not data has already been entered for an area for the pass number under consideration (block 328). If there is data entered, flow goes to block 330 to determine if changes are needed, if not, the user presses the "NEXT" key on the keyboard (block 332) with flow continuing at block 348 in FIG. 22*a*, if changes are needed, then the user presses the "DOWN" arrow on the keyboard (block 331) with flow then directed to block 334. If the answer at block 328 as to whether data has already been entered is no, flow continues to block 334 where the user uses the arrow keys 278 (up, down, left, right) (FIG. 20) to control rotation stepper motor 148 (left and right) and flow stepper motor 128 (up and down), with a water stream coming from noble 150 or 150' of sprinkler head 102 or 102' to position the water stream at the desired location of the corner being programmed. When the user is satisfied with the point being hit by the water jet, the "NEXT" button is pressed (block 336) thus saving an electrical value corresponding to the position of nozzle gear 142 relative to the "home" position where magnet 160 is opposite position Hall sensor 158, and the signal level received by flow rate Hall sensor 138 that is indicative of the water flow through the sprinkler head at the corresponding corner. Those values are stored in RAM 188 in the sprinkler head together with the pass and corner numbers, stress tolerance and dose level for that planted area of interest, or pass number. Then the value of variable "CORNER" is advanced by "1" (block 338), and the variable "CORNER" is checked to determine if the current value is "5". If "CORNER" is not "5", the corner number is displayed, screen 2 is advanced and flow returns to block 334 for user positioning of the water stream for the next corner or point and saving that information in the same way as for the first corner.

Note, if two consecutive points that define the area of interest are the same, then when screen 2 displays the next corner number, the user need only press the "NEXT" button if the sprinkler head has not rotated from the previous position. In this example, all four points need to be defined even if the area of interest is a triangle, line or single point, however, provision could be made in the firmware in each sprinkler head for the user to also select the type of area to be programed with the system firmware then only asking for the corresponding number of points to be identified.

On the other hand, if at block 340 "CORNER" equals "5", all of the points of the current area have been entered and screen 3 (284) displays the message "calculating area, please wait" (blocks 342 and 344). Once that area is calculated, the length of time needed to deliver the selected dose to that area is calculated and stored with the rest of the data for that area, or pass number, of the system (block 346), the flow goes to block 348 in FIG. 22*a* via "B" and "B" in FIGS. 22*b* and 22*a*. At block 348 the variable "PASS" is advanced by "1" for the next area to be watered, if there is another, by the same sprinkler head to be programed. Flow then proceeds to block 350 to determine if there is another pass to be programed for the same sprinkler head. If there is another pass to be programed, the user presses the "DOWN" key on the keyboard (block 352) and flow continues at block 308 to program that pass as the first pass was programed.

If there are no other passes to be programed for the current sprinkler head, the user presses the "NEXT" button (block 354), screen 3 is extinguished and the system with respect to the current sprinkler head is switched to the programed operational mode (block 356) and the remote unit, if used for programing, is unplugged from connector 156 on the sprinkler head.

In the alternative situation where the user specifies how many points define the planted area of interest is shown in FIG. 22*c* with flow from "A" of FIG. 22*a* going to "A" of FIG. 22*c*. In FIG. 22*c,* each block that is the same as in FIG. 22*b* has the same reference number. In comparing the two figures it can be seen that there are only two differences. The first difference is that flow from "A" in FIG. 22*c* first goes to block 325 where the user enters the number of points, or corners, that are to be used to define the planted area of interest. That number can be 1 or greater. From block 325 flow continues to blocks 326 through 336 which are the same as in FIG. 22*b* and perform the same functions in the same sequence. Then from block 336, flow continues to new block 337 where the variable "corner" is tested to determine if its value is equal to the number of points that the user entered at block 325. If the value of "corner" equals the user entered number of points, then flow is directed to block 342 with the sequence and functions of the following blocks being the same as in FIG. 22*b* after which flow returns to FIG. 22*a* via "B". If the value of "corner" is not equal to the number of points entered by the user, then flow continues with block 338 where the value of "corner" is advanced by one and flow returns to block 334 for entry of the next corner. Other than the number of points being selected by the user and the subsequent number of loops through the routine for programing them into the sprinkler head, the rest of the programing sequence before, in that loop and after are the same as in the combination of FIGS. 22*a* and 22*b*.

Figure 23:
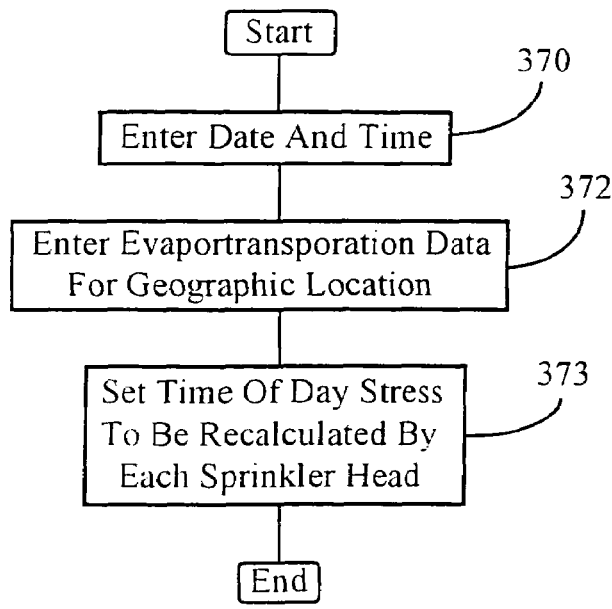
FIG. 23 is a flow chart of the local programming of the controller for local conditions.

Attention is now directed to FIG. 23 where a flow chart is presented to illustrate programming of controller 100 or 100' for local geographic conditions where the sprinkler system is installed, e.g., Santa Clara County, Calif. When the system is initially installed, or when memory is lost for whatever reason, the system controller 100 or 100' needs to be programed for date and time (block 370), the evapotransporation data for the geographic location (block 372), and the time that the stress level is to be recalculated every day by each sprinkler head for each pass, or area, that it is programed to service (block 373).

Figure 24A:
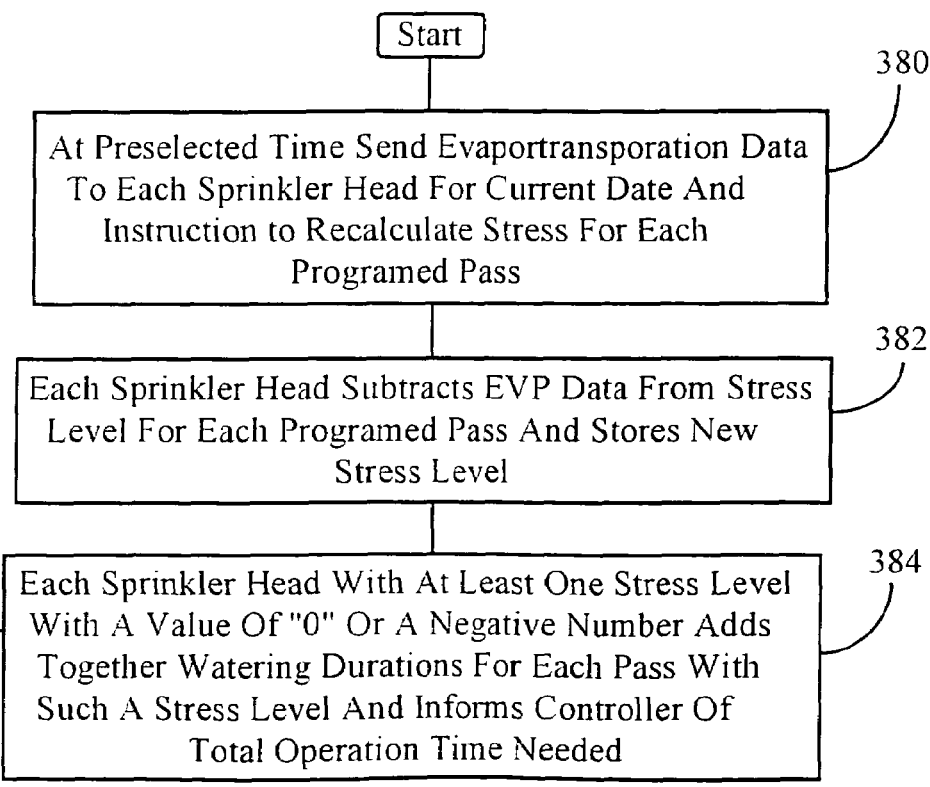
FIGS. 24a and 24b together are a flow chart of the operation of the sprinkler system of the present invention.
Figure 24B:
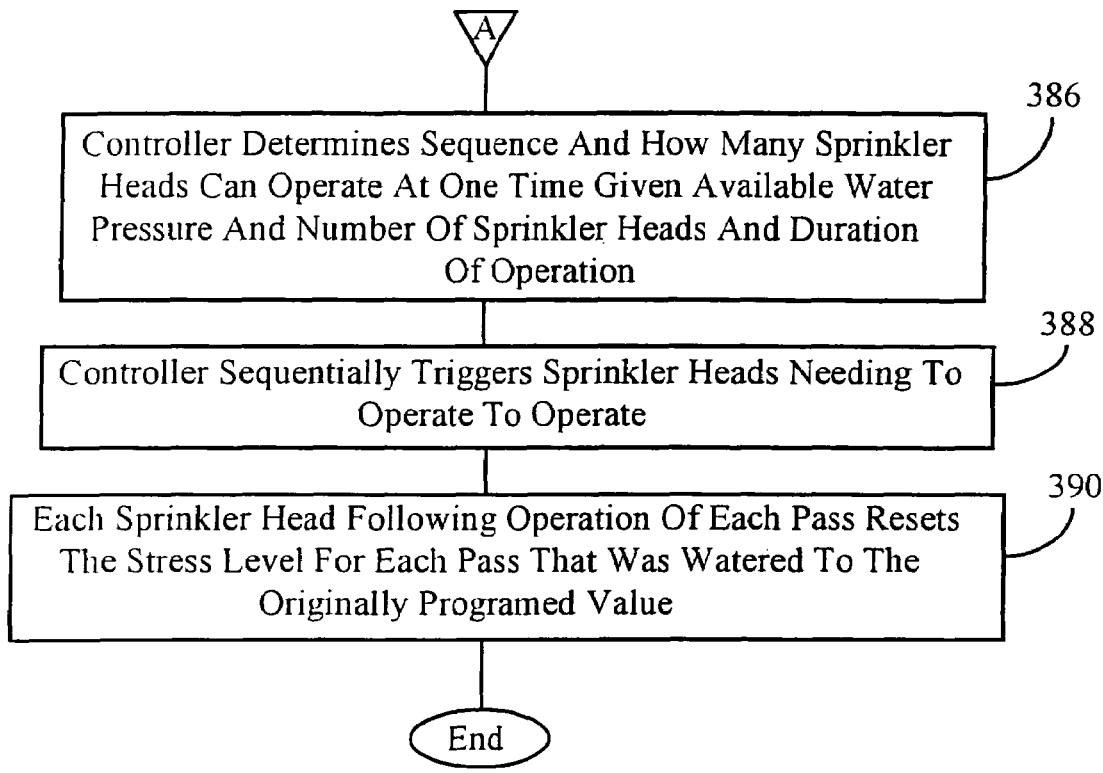

Then when controller 100 or 100' and at least one sprinkler head are programed, the system is placed in the operational mode as illustrated in FIGS. 24*a* and 24*b* which present a flow chart of the operation of the sprinkler system of the present invention. At block 380 the controller, at the preprogramed time of each day sends the current $ET_0$ for the installed region to each sprinkler head together with instructions to recalculate the effective stress level for each pass that the sprinkler head has been programed to serve.

At block 382 each sprinkler head then subtracts the $ET_0$ value from the effective stress level for each pass and stores the new effective stress level in RAM 188. Next, at block 384, each sprinkler head with at least one pass with an effective stress level that is zero, or a negative number, determines the total length of time that it needs to be activated for each pass to be watered and sends that information to controller 100 or 100' over electric/data line 104.

With the information from the various sprinkler heads connected to the irrigation system, controller 100 or 100' (block 386) determines the sequence of operation of the various sprinkler heads, and how many can operate at the same time, given the demand of the various sprinkler heads and the available water pressure. Following the determination of the sequencing (block 388), the controller sends individual signals, including sprinkler head number, to each of the sprinkler heads in the sequence to initiate operation. Then at block 390, each sprinkler head, for each pass that was watered, resets the effective stress level for each such pass to the originally programed stress tolerance for that pass that was originally programed into the sprinkler head.

Figure 26:
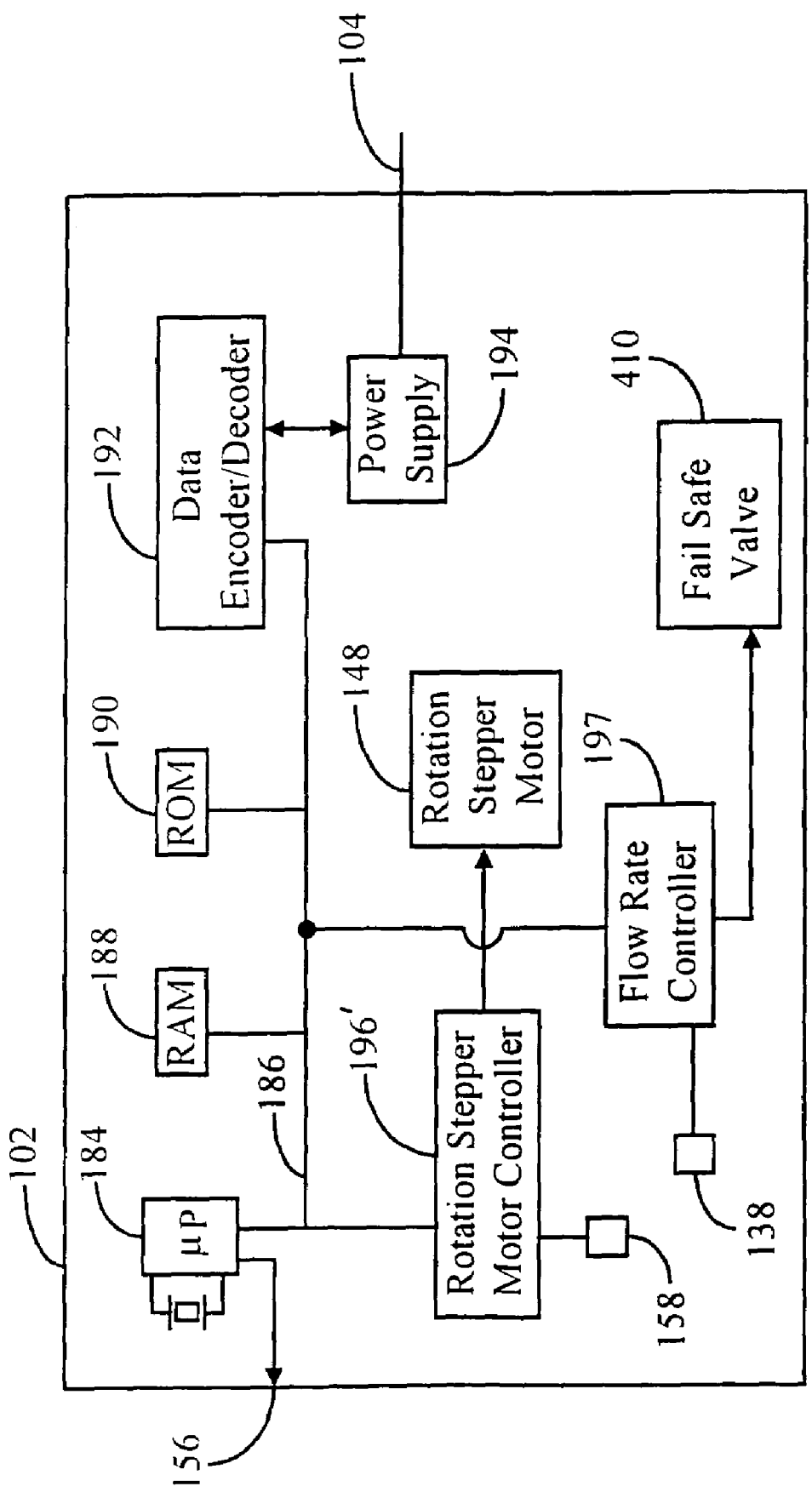
FIG. 26 is a modified block diagram of the electronic circuitry of the sprinkler head for use with a fail safe valve.

Another valve configuration of the present invention is a fail safe valve which automatically closes when power and activation signal is not present. In FIG. 26 there is shown a block diagram of the electronics included in sprinkler head 102 that uses this valve. The differences between this diagram and those of FIGS. 8 and 9 are: there is now only one stepper motor 148 to control the angular positioning of nozzle 150 or 150'; stepper motor controller 196' only controls rotation stepper motor 148 and interfaces with rotation Hall sensor 158; a separate flow rate controller 197 is included and interfaces with flow rate Hall sensor 138; and the operation of fail safe valve 410 is controlled by flow rate controller 197. Otherwise the remainder of the sprinkler head electronics and the sprinkler system electronics is unchanged. This arrangement operates in substantially the same way as the other configurations.

Figure 28:
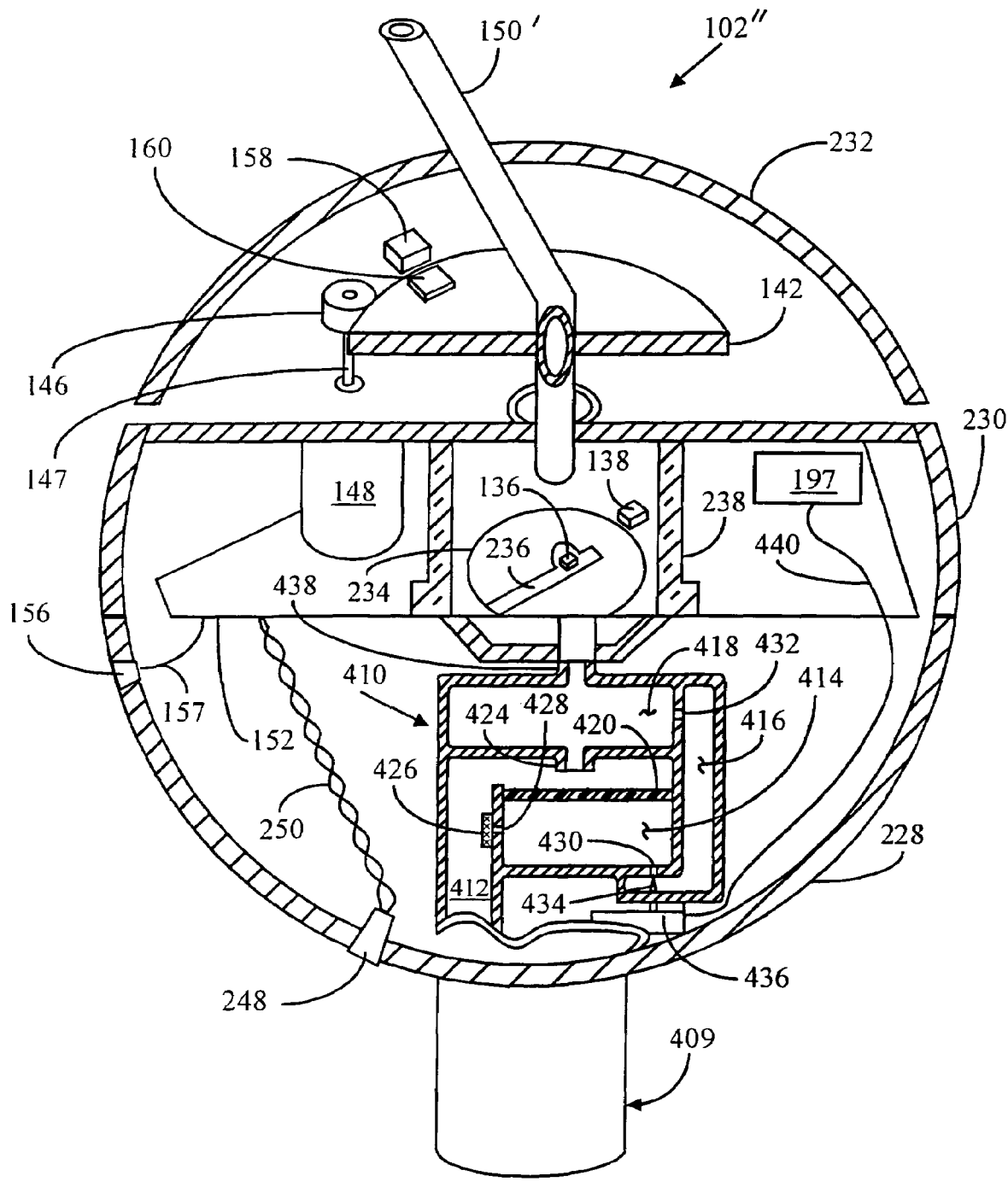
FIG. 28 is a cross sectional view of the sprinkler head embodiment of the present invention that includes the fail safe valve of the present invention.

FIG. 28 is a view of a sprinkler head 102" that incorporates valve 410 and is otherwise the same as sprinkler head 102' shown in FIG. 12. There is a standard sized PVC fitting 409 at the bottom of sprinkler head 120", to be connected to a riser that is connected to the water feed line, that leads into an input chamber 412. When valve 410 is activated the water flows from input chamber 412 into buffer chamber 418 and from valve output port 438 and past flow rate finger 236 with the remainder of sprinkler head 102" operating as was described for sprinkler head 102' in FIG. 12.

Figure 27B:
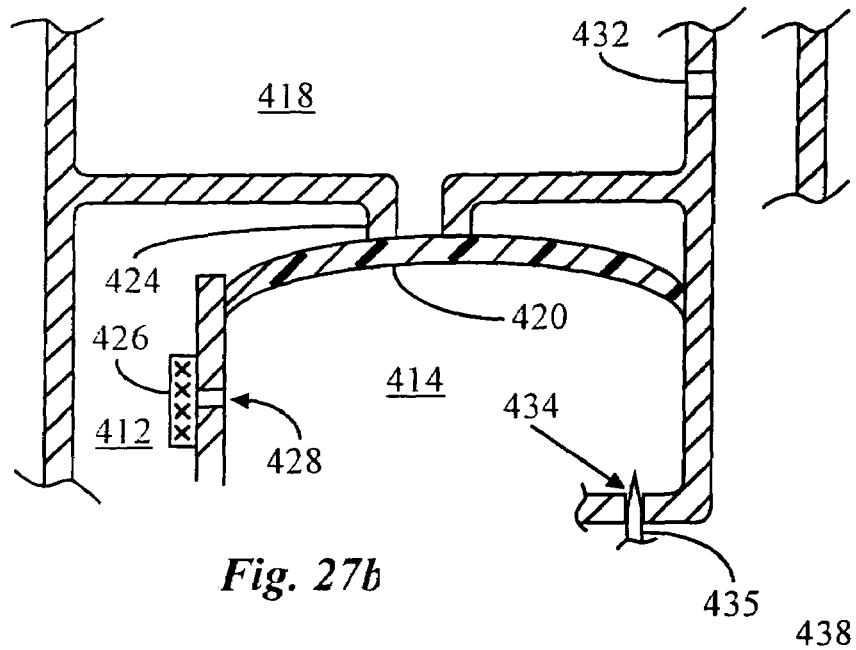
FIG. 27b is a partial side cross-sectional view of the fail safe valve of the present invention in the non-activated position.
Figure 27A:
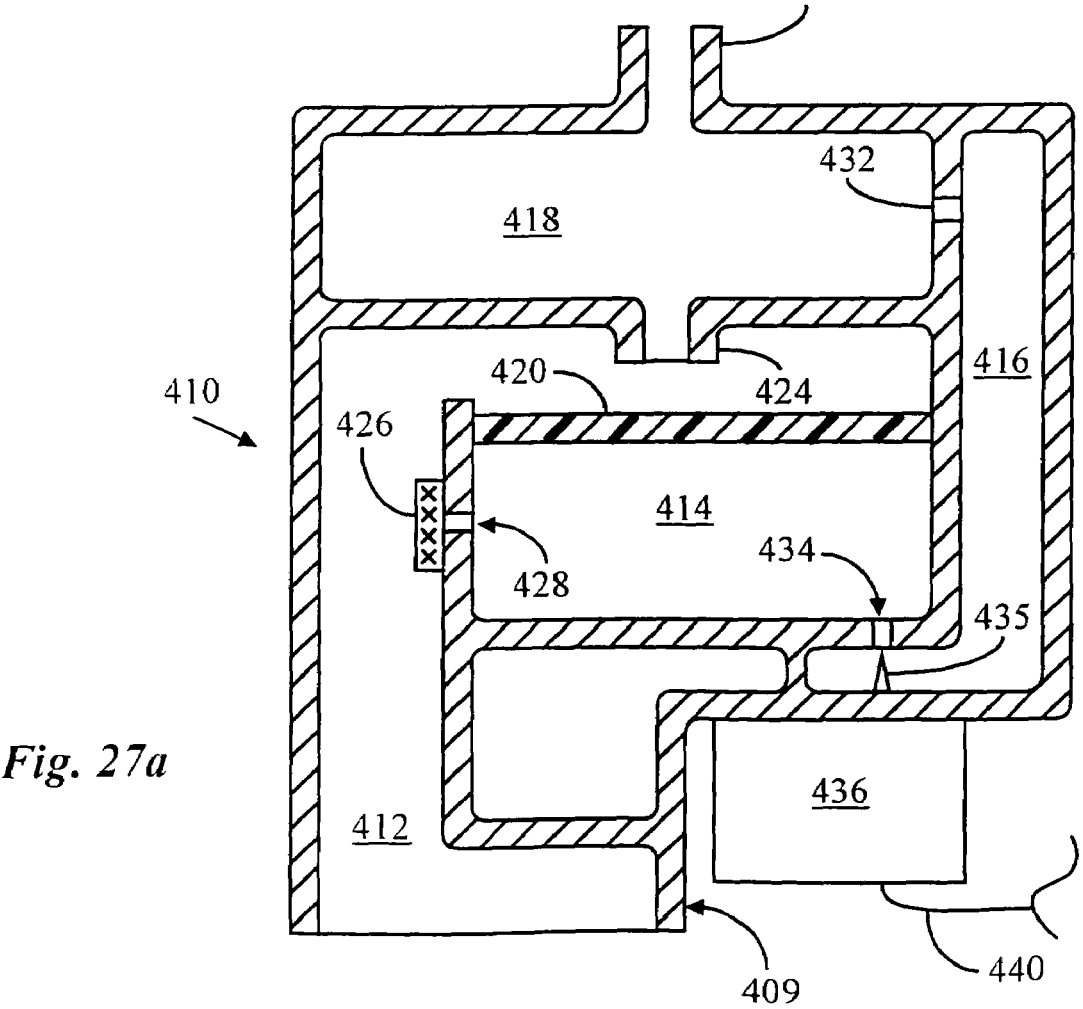
FIG. 27a is a side cross-sectional view of a fail safe valve of the present invention in the activated position.

From FIGS. 27a and 27b the construction of valve 410 can be more easily seen. FIG. 27a illustrates the details of the design of valve 410. Those portions that are shown with simple cross-hatching are ridged, while the one portion shown with the more complex cross-hatching is a flexible membrane 420. As described above, fitting 409 which couples to a riser and in turn to a water feed line leads the water into input chamber 412. Since water is flowing through valve 410 in this view, water flows in two directions. The main flow is from input chamber 412, through port 424 into control chamber 414, and out output port 438 to flow finger 236 and beyond, eventually to nozzle 150'. The secondary flow follows a control path through filter 426 and hole 428 into buffer chamber 418, through hole 434 past needle valve 435 into bypass chamber 416, and then through hole 432 into buffer chamber 418.

Focus is directed to the control path and details thereof to better understand that operation of valve 410. First some basics. Filter 426 is provided to prevent small particles that may be in the water from blocking hole 428 which is very small, e.g., having a diameter of perhaps 0.007 inches leading into control chamber 414 which includes flexible membrane 420 as describe above. The control path continues through hole 434 with the flow therethrough controlled by the extent to which needle 435 extends into hole 434. Here needle 435 is fully extracted from hole 434 thus permitting the maximum flow rate through the main channel described above. Hole 434 leads into bypass chamber 416 and is directed to hole 432 and into buffer chamber 418. Hole 434 has a larger diameter than does hole 428, e.g., perhaps 0.010 inches, and hole 432 has still a larger diameter than hole 434, e.g., perhaps 0.012 inches. As will be seen in the discussion that follows holes 428, 434 and 432 have progressively larger diameters so the later holes in the control path do not create a back pressure on the flow through hole 428.

Thus when needle 435 is fully extracted from hole 434 as shown in this view, the water pressure in input chamber 412 and control chamber 414 are substantially equalized with flexible membrane 420 in substantially a relaxed position. Additionally there will be water flowing through holes 428, 434 and 432 with the water flowing through bypass chamber 416 and into buffer chamber 418 also serving to improve linearity in the valve by reducing inherent positive feedback in the valve. To control the flow through the main path, needle 435 is controlled by solenoid 436, e.g., a linear solenoid.

With needle 435 being spring loaded to extend from solenoid 436, needle 435 is fully seated in hole 434 when no power is applied to solenoid 436. When solenoid 436 is activated with varying control signals from flow rate controller 197 (FIG. 26) via line 440, needle 435 is extracted a corresponding distance from being fully seated in hole 434 in proportion to the signal from flow rate controller 197. As needle 435 approaches and extends into hole 434 from the position shown in FIG. 27a, the water pressure in control chamber 414 slowly increases and causes flexible membrane 420 to slowly bulge outward from control chamber 414, thus eventually creating a seal with the open end of port 424 thus reducing the flow rate of water into buffer chamber 418 as well as bypass chamber 416.

As shown in FIG. 27b, which is a partial view of valve 410 in FIG. 27a, needle 435 is fully seated in hole 434 resulting in the pressure in control chamber 414 increasing to bulge flexible membrane 420 sufficiently to close and seal with port 424. With flexible membrane 420 sealed with port 424 there is substantially no water flow into buffer chamber 418 and from output port 438.

The technique implemented in, and described above, for determining when and how much to water an area defined by the user is a modification of the "checkbook method" presented by Stephen W. Smith on pages 180-195 of his book entitled *Landscape Irrigation Design and Management* (John Wiley & Sons, 1997).

While the various details have been provided relative to the various components of the system of the present invention, their mechanical construction and interaction with each other, and their method of operation as a system, no portion of the present invention is limited to only what is disclosed here. Equivalents of each could easily be constructed or devised. The scope of the present invention is only limited to the scope of the claims included herewith, and equivalents of what is described in those claims.

What is claimed is:

1. A sprinkler head for accurate deliver of water to a defined planted area of interest, said sprinkler head comprising:

a housing having a central axis;

an input port disposed to be coupled to a water source;

a flow rate varying means coupled to said input port to provide controlled water flow from said input port and into said sprinkler head during delivery of water to the planted area of interest;

a flow rate monitoring unit adjacent said flow rate varying means to monitor said water flow;

wherein said flow rate monitoring unit comprises:

a flexible finger having a proximate end mounted to a fixed position relative to said water flow and a distal end extending into a path of said water flow with said distal end of said flexible finger being in a relaxed position when said flow rate is zero and a displaced position when said flow rate is non-zero, with the extent of said displaced position being directly related to said flow rate;

a magnet securely mounted at one of a fixed position adjacent said distal end of said flexible finger and on said distal end of said flexible finger; and a flow rate magnetic field sensor securely mounted at the other of said fixed position adjacent said distal end of said flexible finger and on said distal end of said flexible finger adjacent said magnet, with said flow rate magnetic field sensor providing an electrical signal directly related to the strength of a magnetic field detected from said magnet with said electric signal directly related to said flow rate during delivery of water to the planted area of interest;

a nozzle having a proximate end disposed to receive said water flow and a distal end from which said water is expelled to said planted area of interest with said distal end positioned a fixed distance from said central axis;

a drive means, having said central axis as axis of rotation, affixed to said nozzle to angularly position said distal end of said nozzle during delivery of water to said planted area of interest while maintaining said distal end at said fixed distance from said central axis;

an angular position monitoring unit disposed to determine an angular position of said distal end of said nozzle around said central axis; and a control subsystem coupled to said flow rate varying means, said flow rate monitoring unit, said drive means and said angular position monitoring unit to positively and continuously monitor and control, positively and negatively, the water flow rate through, and angular position of, said nozzle as many times as necessary to accurately and evenly deliver water to the planted area of interest.

2. A sprinkler head for accurate deliver of water to a defined planted area of interest and having a horizontal axis and a vertical central axis, said sprinkler head comprising:

an input port disposed to be coupled to a water source;

a nozzle having a proximate end and a distal end with the distal end defining an output orifice that is disposed to expel water therefrom to said planted area of interest with said output orifice positioned a fixed distance from said central vertical axis;

an angular position control subsystem to positively and continuously control and vary the angular position of said output orifice around said vertical central axis of said sprinkler head, in either direction, as many times as necessary, during delivery of water to the planted area of interest while maintaining said output orifice at said fixed distance from said vertical central axis wherein said angular position control subsystem comprises:

a nozzle drive means affixed to said nozzle to angularly position said distal end of said nozzle during delivery of water to the planted area of interest; and an angular position monitoring unit disposed to determine an angular position of said output orifice of the distal end of said nozzle around said vertical central axis during delivery of water to the planted area of interest;

a water control subsystem to positively and continuously control and increase or decrease the flow rate of water into said proximate end of said nozzle and therefore from said output orifice as many times as necessary during delivery of the water a desired distance from said sprinkler head to limit, and evenly deliver, water to said planted area of interest as said angular position and flow rate are varied in coordination one with the other during delivery of water to the planted area of interest and including:

a flow rate varying means coupled to said input port to vary said water flow into said sprinkler head; and a flow rate monitoring unit adjacent said flow rate control means to monitor said water flow wherein said flow rate monitoring unit comprises:

a flexible finger having a proximate end mounted to a fixed position relative to said water flow and a distal end extending into a path of said water flow with said distal end of said flexible finger being in a relaxed position when said flow rate is zero and a displaced position when said flow rate is non-zero, with the extent of said displaced position being directly related to said flow rate;

a magnet mounted securely mounted at one of a fixed position adjacent said distal end of said flexible finger and on said distal end of said flexible finger; and a flow rate magnetic field sensor securely mounted at the other of said fixed position adjacent said distal end of said flexible finger and on said distal end of said flexible finger adjacent said magnet, with said flow rate magnetic field sensor providing an electrical signal directly related to the strength of a magnetic field detected from said magnet with said electric signal directly related to said flow rate during delivery of water to the planted area of interest; and a control subsystem coupled to said flow rate varying means, said flow rate monitoring unit, said nozzle drive means and said angular position monitoring unit to monitor and control the flow rate of water through, and angular position of said nozzle during delivery of water to the planted area of interest.

3. A sprinkler head for accurate deliver of water to a defined planted area of interest, said sprinkler head comprising:

a housing having a central axis;

an input port disposed to be coupled to a water source;

a flow rate varying means coupled to said input port to provide controlled water flow from said input port and into said sprinkler head during delivery of water to the planted area of interest;

a flow rate monitoring unit adjacent said flow rate varying means to monitor said water flow;

a nozzle having a proximate end disposed to receive said water flow and a distal end from which said water is expelled to said planted area of interest with said distal end positioned a fixed distance from said central axis;

a drive means, having said central axis as axis of rotation, affixed to said nozzle to angularly position said distal end of said nozzle during delivery of water to said planted area of interest while maintaining said distal end at said fixed distance from said central axis;

an angular position monitoring unit disposed to determine an angular position of said distal end of said nozzle around said central axis;

wherein said angular position monitoring unit comprises:

a magnet securely mounted at one of a fixed position adjacent said drive means and on said drive means; and an angular position magnetic field sensor securely mounted at the other of said fixed position adjacent said drive means and on said drive means adjacent said magnet, with said angular position magnetic field sensor providing a strongest electrical signal when said magnet is closest said angular position magnetic field sensor to define a zero degree angular position for said nozzle during delivery of water to the planted area of interest; and a control subsystem coupled to said flow rate varying means, said flow rate monitoring unit, said drive means and said angular position monitoring unit to positively and continuously monitor and control, positively and negatively, the water flow rate through, and angular position of, said nozzle as many times as necessary to accurately and evenly deliver water to the planted area of interest.

4. A sprinkler head for accurate deliver of water to a defined planted area of interest, said sprinkler head comprising:

a housing having a central axis;

an input port disposed to be coupled to a water source;

a flow rate varying means coupled to said input port to provide controlled water flow from said input port and into said sprinkler head during delivery of water to the planted area of interest;

a flow rate monitoring unit adjacent said flow rate varying means to monitor said water flow wherein said flow rate varying means includes a fail-safe means with a zero flow rate therethrough when not activated;

a nozzle having a proximate end disposed to receive said water flow and a distal end from which said water is expelled to said planted area of interest with said distal end positioned a fixed distance from said central axis;

a drive means, having said central axis as axis of rotation, affixed to said nozzle to angularly position said distal end of said nozzle during delivery of water to said planted area of interest while maintaining said distal end at said fixed distance from said central axis wherein said drive means includes a nozzle gear attached near a proximate end of said nozzle;

an angular position monitoring unit disposed to determine an angular position of said distal end of said nozzle around said central axis; and a control subsystem coupled to said flow rate varying means, said flow rate monitoring unit, said drive means and said angular position monitoring unit to positively and continuously monitor and control, positively and negatively, the water flow rate through, and angular position of, said nozzle as many times as necessary to accurately and evenly deliver water to the planted area of interest wherein said control subsystem comprises:

a local controller that comprises:

a local processor coupled to said flow rate monitoring unit and said angular position monitoring unit;

local memory coupled to said local processor to provide temporary and permanent data storage for said local processor;

a stepper motor controller coupled to said local processor, and said angular positioning stepper motor, to receive angular position signals from said local processor and to convert said angular position signals to corresponding drive signals to exercise said angular positioning stepper motor; and a signal converter coupled to said local processor, and said activation means, to receive flow rate signals from said local processor and to convert said flow rate signals to corresponding activation signals to exercise said activation means;

an activation means coupled to said local controller and said flow rate varying means to selectively control said flow rate varying means to adjust the water flow rate into said sprinkler head wherein said activation means is coupled to said fail-safe means to open same in response to electrical signals from said local controller; and an angular positioning stepper motor electrically coupled to said local controller, having a shaft with a drive gear mounted thereon, and mounted in a fixed position to mesh said drive gear with said nozzle gear to position said nozzle during delivery of water to the planted area of interest.

5. A sprinkler head for accurate deliver of water to a defined planted area of interest, said sprinkler head comprising:

a housing having a central axis;

an input port disposed to be coupled to a water source;

a flow rate varying means coupled to said input port to provide controlled water flow from said input port and into said sprinkler head during delivery of water to the planted area of interest;

a flow rate monitoring unit adjacent said flow rate varying means to monitor said water flow wherein said flow rate varying means includes:

an input chamber in communication with said input port;

a buffer chamber having:

an input side defining an input port therethrough with said input port disposed to receive water from said input chamber; and an output side defining an output port therethrough disposed to deliver water to said flow rate monitoring unit;

a control chamber having:

a first side defining a first small hole therethrough having a first diameter to provide a passage for water from said input chamber into said control chamber;

a second side defining a second small hole therethrough having a second diameter; and a flexible membrane forming a third side adjacent said input port of said input side of said buffer chamber;

a bypass chamber:

sharing said second side of said control chamber with said second small hole providing a passage for water from said control chamber into said bypass chamber; and having a buffer side defining a third small hole therethrough having a third diameter to provide a passage for water from said bypass chamber into said buffer chamber; and an activation means coupled to said control subsystem and having a needle valve aligned with said second hole and sized to meter water flow through said second hole in response to different signals applied to said activation means by said control subsystem and said needle valve to close with said second hole when no signal is applied to said activation means;

wherein the distance between said flexible membrane and said input port of said buffer chamber increases proportionally as said needle valve moves away from said second hole and deceases proportionally as said needle valve is advanced into said second hole with said flexible membrane sealing with said input port when said needle valve is seated in said second hole;

a nozzle having a proximate end disposed to receive said water flow and a distal end from which said water is expelled to said planted area of interest with said distal end positioned a fixed distance from said central axis;

a drive means, having said central axis as axis of rotation, affixed to said nozzle to angularly position said distal end of said nozzle during delivery of water to said planted area of interest while maintaining said distal end at said fixed distance from said central axis;

an angular position monitoring unit disposed to determine an angular position of said distal end of said nozzle around said central axis; and a control subsystem coupled to said flow rate varying means, said flow rate monitoring unit, said drive means and said angular position monitoring unit to positively and continuously monitor and control, positively and negatively, the water flow rate through, and angular position of, said nozzle as many times as necessary to accurately and evenly deliver water to the planted area of interest.

6. The sprinkler head as in claim 5 wherein said first small hole is smaller than said second small hole, and said second small hole is smaller than said third small hole.

7. A sprinkler head for accurate deliver of water to a defined planted area of interest and having a horizontal axis and a vertical central axis, said sprinkler head comprising:

an input port disposed to be coupled to a water source;

a nozzle having a proximate end and a distal end with the distal end defining an output orifice that is disposed to expel water therefrom to said planted area of interest with said output orifice positioned a fixed distance from said central vertical axis;

an angular position control subsystem to positively and continuously control and vary the angular position of said output orifice around said vertical central axis of said sprinkler head, in either direction, as many times as necessary, during delivery of water to the planted area of interest while maintaining said output orifice at said fixed distance from said vertical central axis wherein said angular position control subsystem comprises:

a nozzle drive means affixed to said nozzle to angularly position said distal end of said nozzle during delivery of water to the planted area of interest; and an angular position monitoring unit disposed to determine an angular position of said output orifice of the distal end of said nozzle around said vertical central axis during delivery of water to the planted area of interest wherein said angular position monitoring unit comprises:

a magnet securely mounted at one of a fixed position adjacent said drive means and on said drive means; and an angular position magnetic field sensor securely mounted at the other of said fixed position adjacent said drive means and on said drive means adjacent said magnet, with said angular position magnetic field sensor providing a strongest electrical signal when said magnet is closest said angular position magnetic field sensor to define a zero degree angular position for said nozzle during delivery of water to the planted area of interest;

a water control subsystem to positively and continuously control and increase or decrease the flow rate of water into said proximate end of said nozzle and therefore from said output orifice as many times as necessary during delivery of the water a desired distance from said sprinkler head to limit, and evenly deliver, water to said planted area of interest as said angular position and flow rate are varied in coordination one with the other during delivery of water to the planted area of interest and including:

a flow rate varying means coupled to said input port to vary said water flow into said sprinkler head; and a flow rate monitoring unit adjacent said flow rate control means to monitor said water flow; and a control subsystem coupled to said flow rate varying means, said flow rate monitoring unit, said nozzle drive means and said angular position monitoring unit to monitor and control the flow rate of water through, and angular position of said nozzle during delivery of water to the planted area of interest.

8. A sprinkler head for accurate deliver of water to a defined planted area of interest and having a horizontal axis and a vertical central axis, said sprinkler head comprising:

an input port disposed to be coupled to a water source;

a nozzle having a proximate end and a distal end with the distal end defining an output orifice that is disposed to expel water therefrom to said planted area of interest with said output orifice positioned a fixed distance from said central vertical axis;

an angular position control subsystem to positively and continuously control and vary the angular position of said output orifice around said vertical central axis of said sprinkler head, in either direction, as many times as necessary, during delivery of water to the planted area of interest while maintaining said output orifice at said fixed distance from said vertical central axis wherein said angular position control subsystem comprises:

a nozzle drive means affixed to said nozzle to angularly position said distal end of said nozzle during delivery of water to the planted area of interest; and an angular position monitoring unit disposed to determine an angular position of said output orifice of the distal end of said nozzle around said vertical central axis during delivery of water to the planted area of interest;

a water control subsystem to positively and continuously control and increase or decrease the flow rate of water into said proximate end of said nozzle and therefore from said output orifice as many times as necessary during delivery of the water a desired distance from said sprinkler head to limit, and evenly deliver, water to said planted area of interest as said angular position and flow rate are varied in coordination one with the other during delivery of water to the planted area of interest and including:

a flow rate varying means coupled to said input port to vary said water flow into said sprinkler head wherein said flow rate varying means includes:

an input chamber in communication with said input port;

a buffer chamber having:

an input side defining an input port therethrough with said input port disposed to receive water from said input chamber; and an output side defining an output port therethrough disposed to deliver water to said flow rate monitoring unit;

a control chamber having:

a first side defining a first small hole therethrough having a first diameter to provide a passage for water from said input chamber into said control chamber;

a second side defining a second small hole therethrough having a second diameter; and a flexible membrane forming a third side adjacent said input port of said input side of said buffer chamber;

a bypass chamber:

sharing said second side of said control chamber with said second small hole providing a passage for water from said control chamber into said bypass chamber; and having a buffer side defining a third small hole therethrough having a third diameter to provide a passage for water from said bypass chamber into said buffer chamber; and an activation means coupled to said control subsystem and having a needle valve aligned with said second hole and sized to meter water flow through said second hole in response to different signals applied to said activation means by said control subsystem and said needle valve to close with said second hole when no signal is applied to said activation means;

wherein the distance between said flexible membrane and said input port of said buffer chamber increases proportionally as said needle valve moves away from said second hole and deceases proportionally as said needle valve is advanced into said second hole with said flexible membrane sealing with said input port when said needle valve is seated in said second hole; and a flow rate monitoring unit adjacent said flow rate control means to monitor said water flow; and a control subsystem coupled to said flow rate varying means, said flow rate monitoring unit, said nozzle drive means and said angular position monitoring unit to monitor and control the flow rate of water through, and angular position of said nozzle during delivery of water to the planted area of interest.

9. The sprinkler head as in claim 8 wherein said first small hole is smaller than said second small hole, and said second small hole is smaller than said third small hole.

* * * * *